(12) United States Patent
Ishikawa et al.

(10) Patent No.: US 8,214,679 B2
(45) Date of Patent: Jul. 3, 2012

(54) MULTI-CORE PROCESSOR SYSTEM WITH THREAD QUEUE BASED POWER MANAGEMENT

(75) Inventors: Yuji Ishikawa, Tokyo (JP); Toshiki Kizu, Kanagawa (JP); Ryuichiro Ohyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 443 days.

(21) Appl. No.: 12/610,472

(22) Filed: Nov. 2, 2009

(65) Prior Publication Data

US 2010/0299541 A1    Nov. 25, 2010

(30) Foreign Application Priority Data

May 21, 2009   (JP) .................................. 2009-123294

(51) Int. Cl.
    *G06F 1/32*    (2006.01)
(52) U.S. Cl. ........................ 713/324; 713/323; 718/102
(58) Field of Classification Search .................. 713/323, 713/324; 718/102
    See application file for complete search history.

(56) References Cited

U.S. PATENT DOCUMENTS

| 6,711,447 B1 * | 3/2004 | Saeed ............................. 700/82 |
| 2009/0328055 A1 * | 12/2009 | Bose et al. .................... 718/105 |

FOREIGN PATENT DOCUMENTS

| JP | 08-006681 | 1/1996 |
| JP | 2008-129846 | 6/2008 |

* cited by examiner

*Primary Examiner* — Albert Wang
(74) *Attorney, Agent, or Firm* — Turocy & Watson, LLP

(57) ABSTRACT

A multi-core processor system includes: a plurality of processor cores; a power supply unit that stops supplying or supplies power to each of the processor cores individually; and a thread queue that stores threads that the multi-core processor system causes the processor cores to execute. Each of the processor cores includes: a power-supply stopping unit that causes the power supply unit to stop power supply to an own processor core when a number of threads stored in the thread queue is equal to or smaller than a first threshold; and a power-supply resuming unit that causes the power supply unit to resume power supply to the other stopped processor cores when the number of threads stored in the thread queue exceeds a second value equal to or lager than the first threshold.

14 Claims, 19 Drawing Sheets

| ID | THREAD PROCESSING START ADDRESS |
|---|---|
| 0 | 0x00001234 |
| 1 | 0x00005678 |
| 2 | |

FIG.6
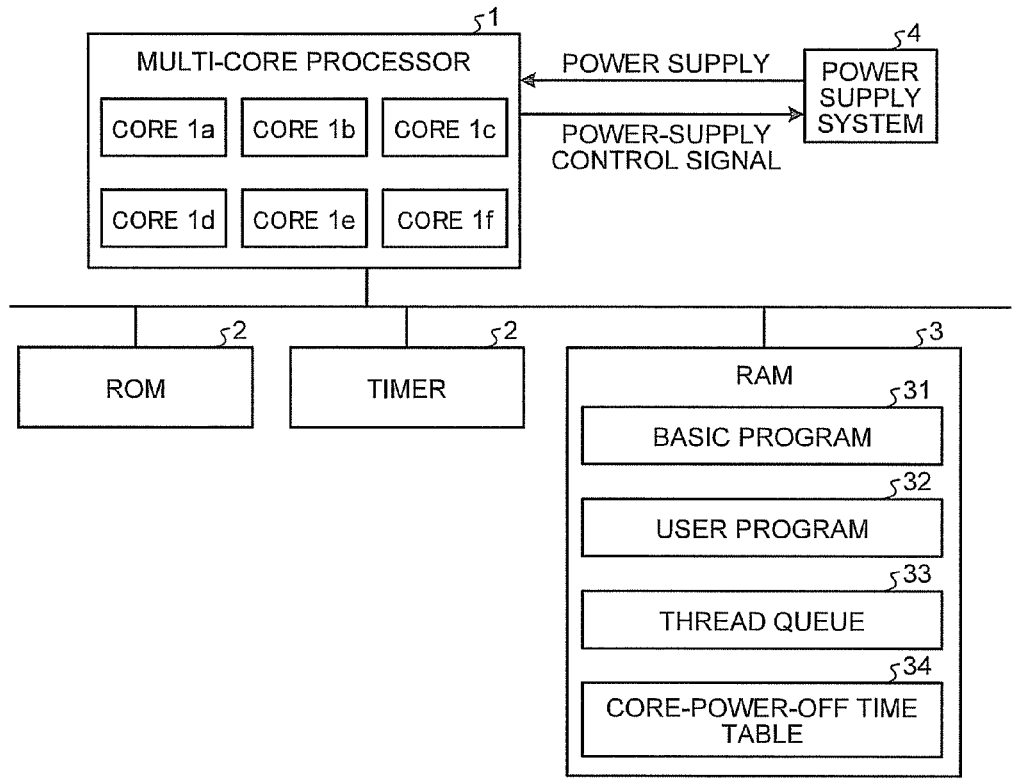
FIG.7
| CORE ID | POWER-OFF TIME |
|---|---|
| 0 | 0 |
| 1 | 0 |
| 2 | 123400 |
FIG.8
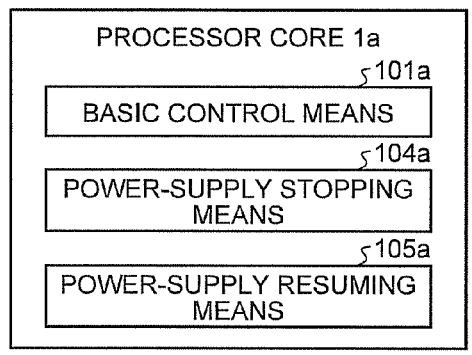

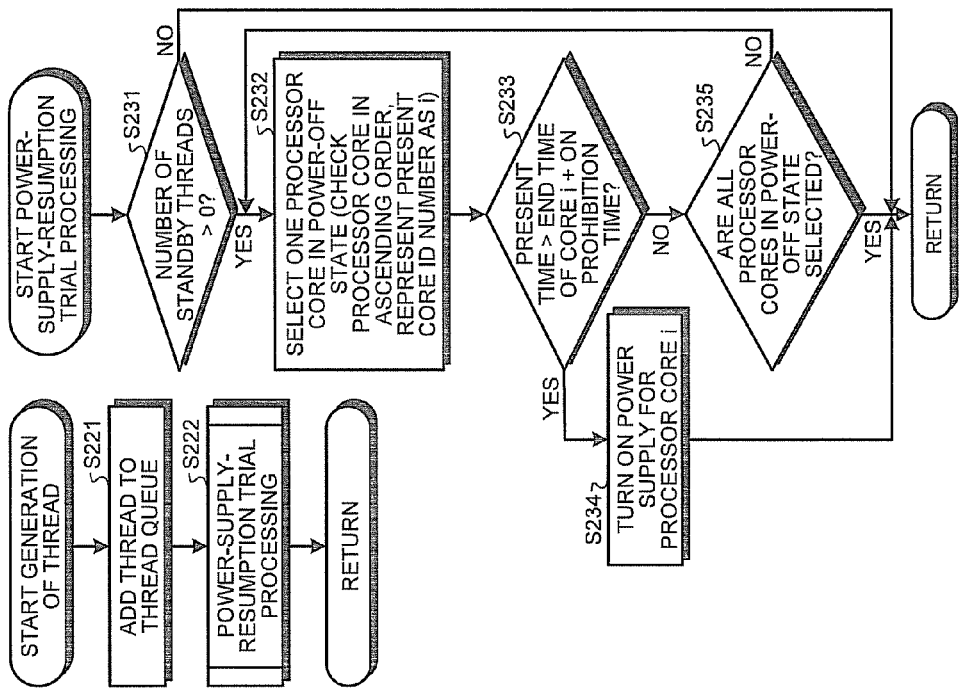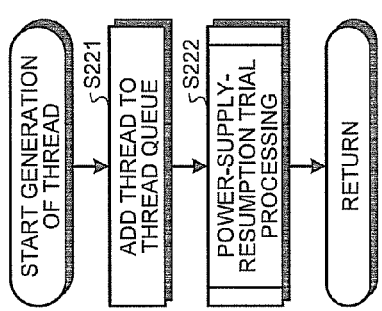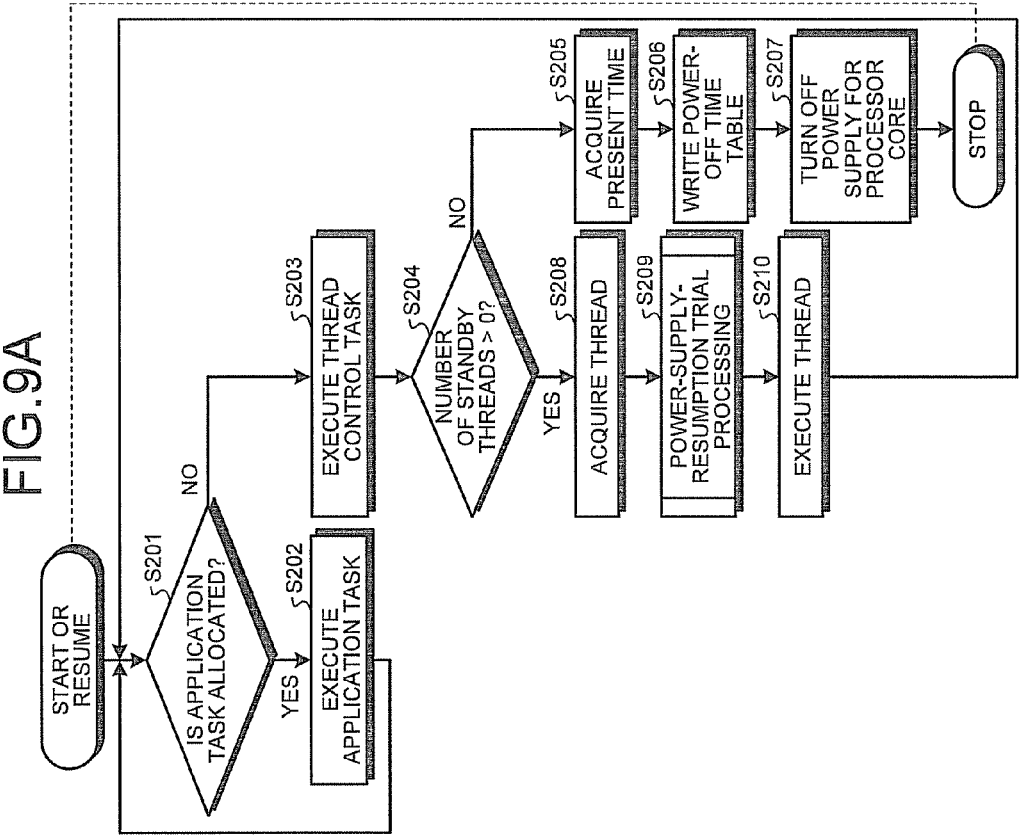

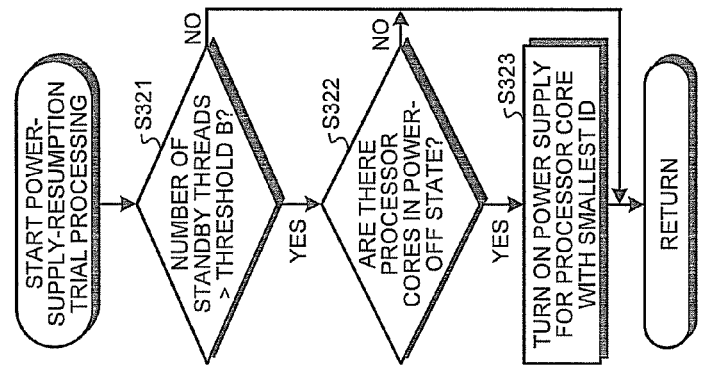
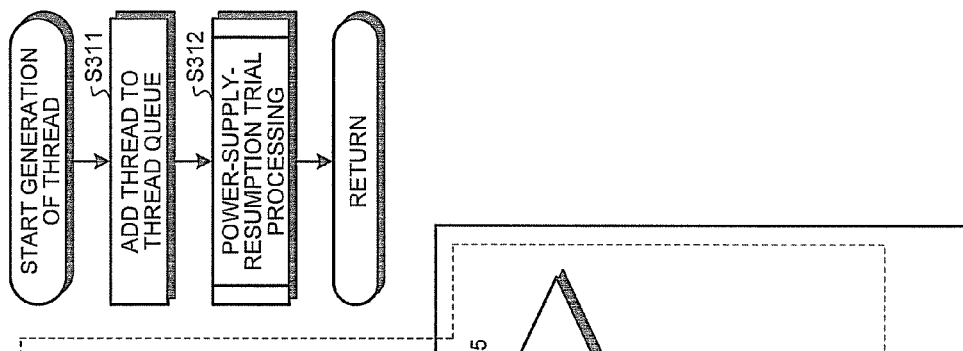
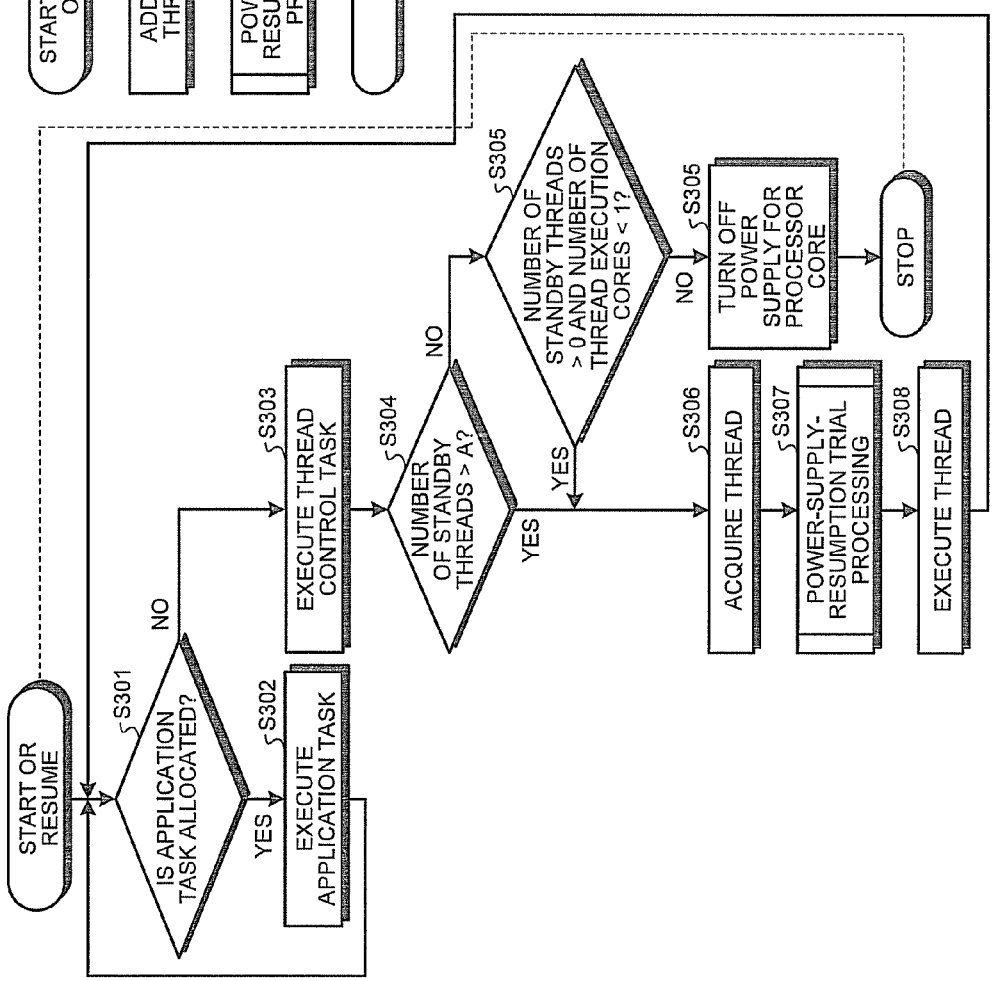

FIG. 12

| TIME | NUMBER OF STANDBY THREADS | THREAD EXECUTION CORES (STATES OF CORES, TOTAL NUMBER OF EXECUTION CORES) | | | | | | EVENT |
|---|---|---|---|---|---|---|---|---|
| | | CORE 1a | CORE 1b | CORE 1c | CORE 1d | CORE 1e | TOTAL NUMBER | |
| 0 | 4 | EXECUTE | EXECUTE | STOP | STOP | STOP | 2 | |
| 1000 | 8 | EXECUTE | EXECUTE | STOP | STOP | STOP | 2 | APPLICATION: ADD THREAD (4) |
| | 8 | EXECUTE | EXECUTE | STOP | STOP | STOP | 2 | APPLICATION: TRY POWER-ON |
| | 7 | EXECUTE | EXECUTE | EXECUTE | STOP | STOP | 3 | CORE 1c: TRY POWER-ON<br>CORE 1c: EXECUTE THREAD |
| | 6 | EXECUTE | EXECUTE | EXECUTE | EXECUTE | STOP | 4 | CORE 1d: EXECUTE THREAD |
| 2000 | 5 | EXECUTE | EXECUTE | EXECUTE | EXECUTE | STOP | 4 | CORE 1a: END THREAD → EXECUTE |
| 3000 | 4 | EXECUTE | EXECUTE | EXECUTE | EXECUTE | STOP | 4 | CORE 1b: END THREAD → EXECUTE |
| 4000 | 3 | EXECUTE | EXECUTE | EXECUTE | EXECUTE | STOP | 4 | CORE 1c: END THREAD → EXECUTE |
| 5000 | 2 | EXECUTE | EXECUTE | EXECUTE | EXECUTE | STOP | 4 | CORE 1d: END THREAD → EXECUTE |
| 6000 | 2 | STOP | EXECUTE | EXECUTE | EXECUTE | STOP | 3 | CORE 1a: END THREAD → STOP CORE |
| 7000 | 5 | STOP | EXECUTE | EXECUTE | EXECUTE | STOP | 3 | APPLICATION: ADD THREAD (3) |
| 8000 | 4 | STOP | EXECUTE | EXECUTE | EXECUTE | STOP | 3 | CORE 1b: END THREAD → EXECUTE |
| 9000 | 3 | STOP | EXECUTE | EXECUTE | EXECUTE | STOP | 3 | CORE 1c: END THREAD → EXECUTE |
| 10000 | 2 | STOP | EXECUTE | EXECUTE | EXECUTE | STOP | 3 | CORE 1d: END THREAD → EXECUTE |
| 11000 | 2 | STOP | STOP | EXECUTE | EXECUTE | STOP | 2 | CORE 1b: END THREAD → STOP CORE |
| 12000 | 2 | STOP | STOP | STOP | EXECUTE | STOP | 1 | CORE 1c: END THREAD → STOP CORE |
| 13000 | 1 | STOP | STOP | STOP | EXECUTE | STOP | 1 | |
| 14000 | 0 | STOP | STOP | STOP | EXECUTE | STOP | 1 | CORE 1d: END THREAD → EXECUTE |
| 15000 | 0 | STOP | STOP | STOP | STOP | STOP | 0 | CORE 1d: END THREAD → STOP CORE |

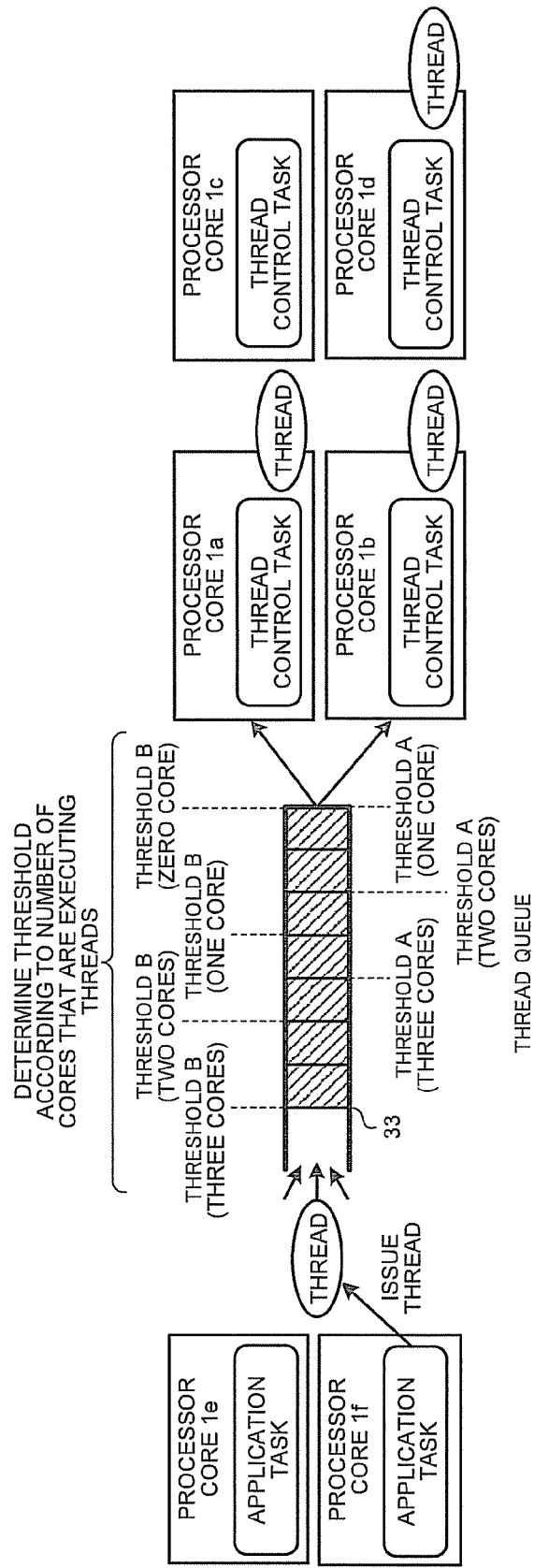

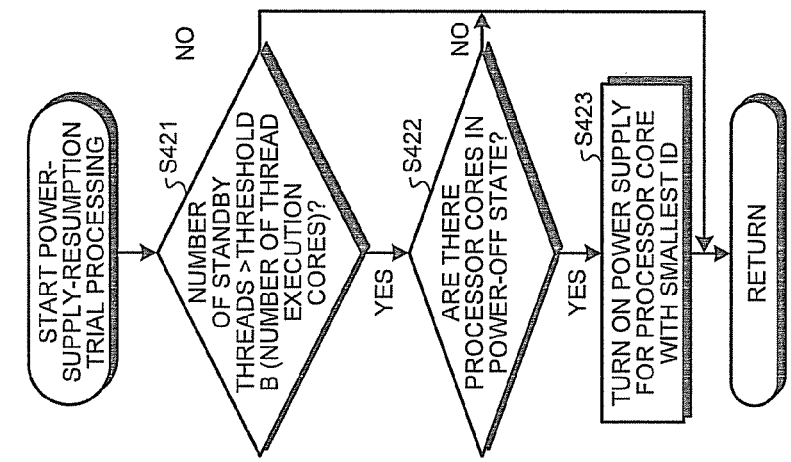
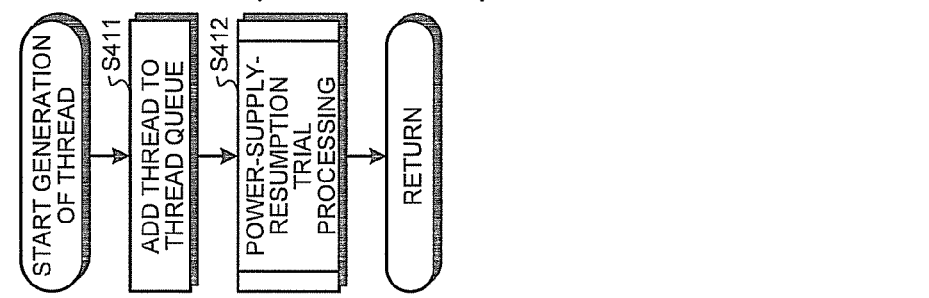
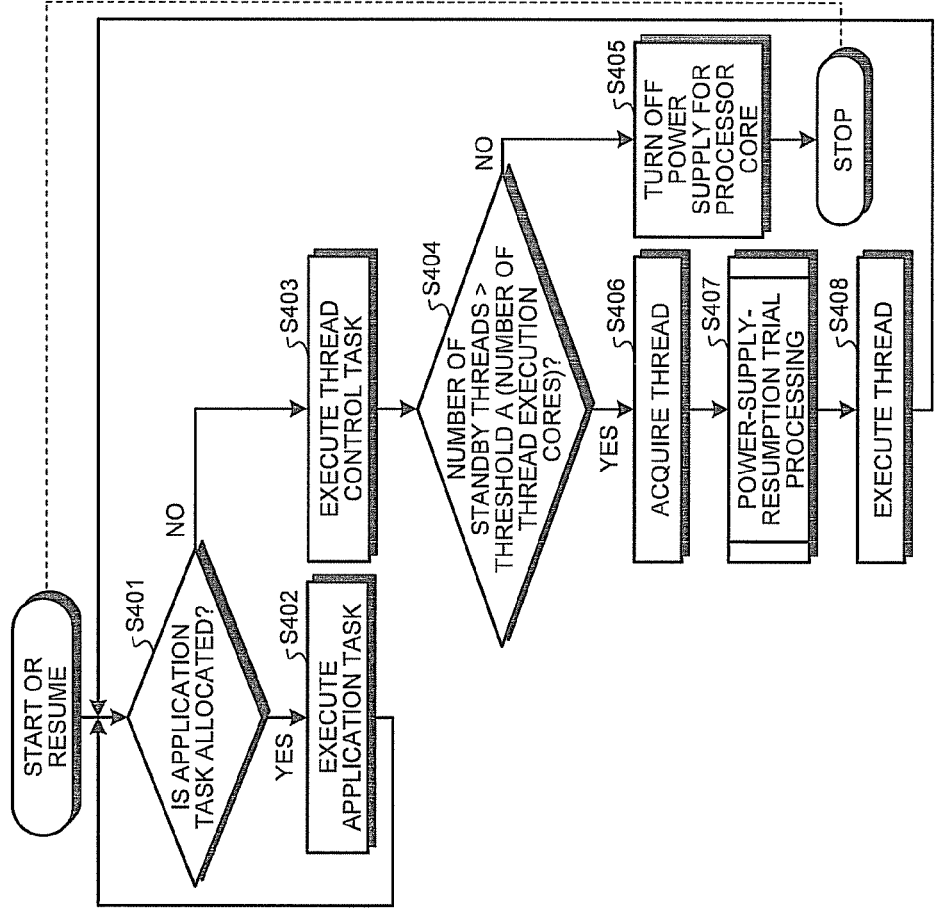

FIG.16

| QUEUE ID | RESOURCE ID | VALUE |
|---|---|---|
| 0 | SCRATCH PAD MEMORY SIZE | 4KByte |
| 0 | EXTENDED COMMAND SET | MULTIPLICATION COMMAND |
| 1 | SCRATCH PAD MEMORY SIZE | 8KByte |
| 1 | EXTENDED COMMAND SET | (UNNECESSARY) |

FIG.17

| CORE ID | RESOURCE ID | VALUE |
|---|---|---|
| 0 | SCRATCH PAD MEMORY SIZE | 8KByte |
| 0 | EXTENDED COMMAND SET | (NONE) |
| 1 | SCRATCH PAD MEMORY SIZE | 4KByte |
| 1 | EXTENDED COMMAND SET | MULTIPLICATION COMMAND |

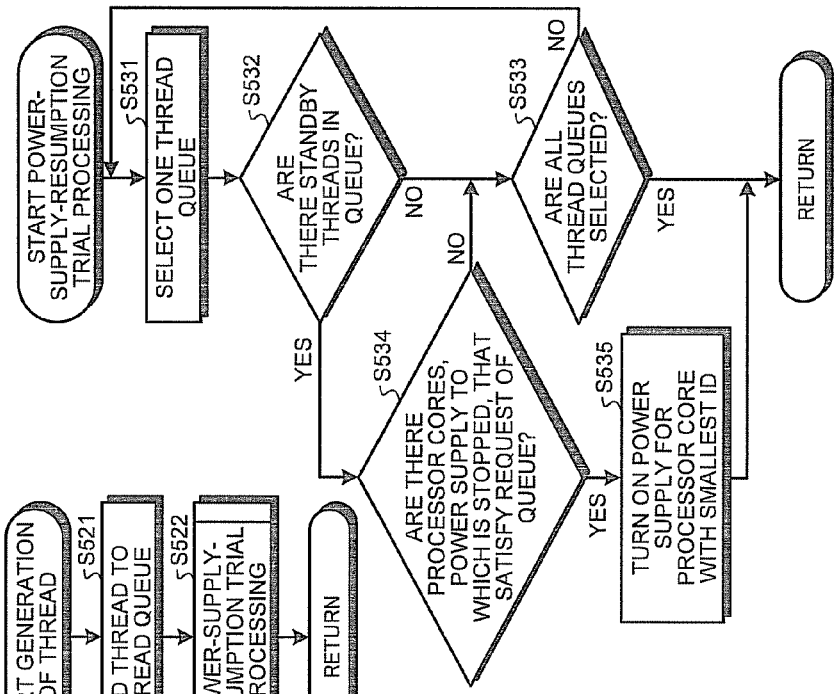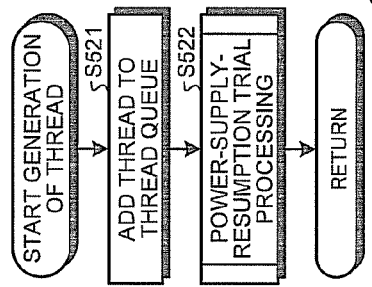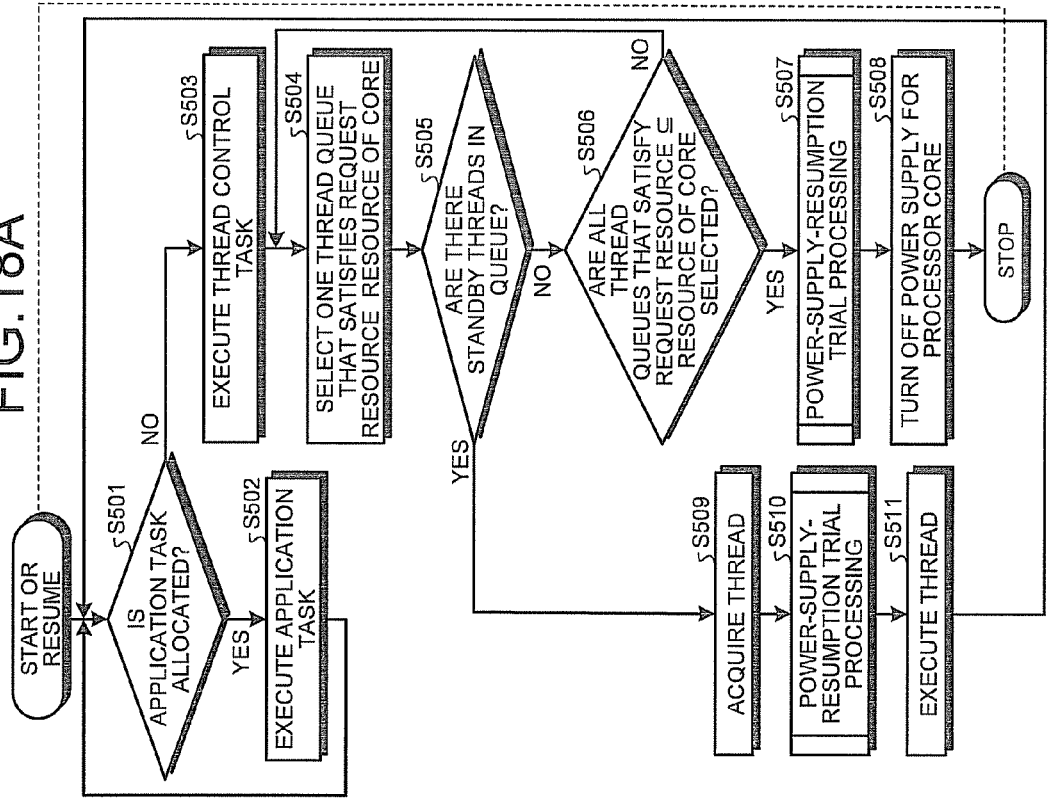

| ID | THREAD PROCESSING START ADDRESS | REQUEST RESOURCE | VALUE |
|---|---|---|---|
| 0 | 0x00001234 | SCRATCH PAD MEMORY CAPACITY | 8KByte |
| | | EXTENDED COMMAND SET | (UNNECESSARY) |
| 1 | 0x00005678 | SCRATCH PAD MEMORY CAPACITY | 4KByte |
| | | EXTENDED COMMAND SET | MULTIPLICATION COMMAND |

| CORE ID | END PREDICTED TIME |
|---|---|
| 1 | 1,240,000,000 |
| 2 | 1,150,000,000 |
| 3 | (STOPPED) |
| 4 | 1,380,000,000 |

| ID | THREAD PROCESSING START ADDRESS | CALCULATION TIME ESTIMATED VALUE |
|---|---|---|
| 0 | 0x00001234 | 200,000,000 |
| 1 | 0x00005678 | 350,000,000 |
| 2 | | |

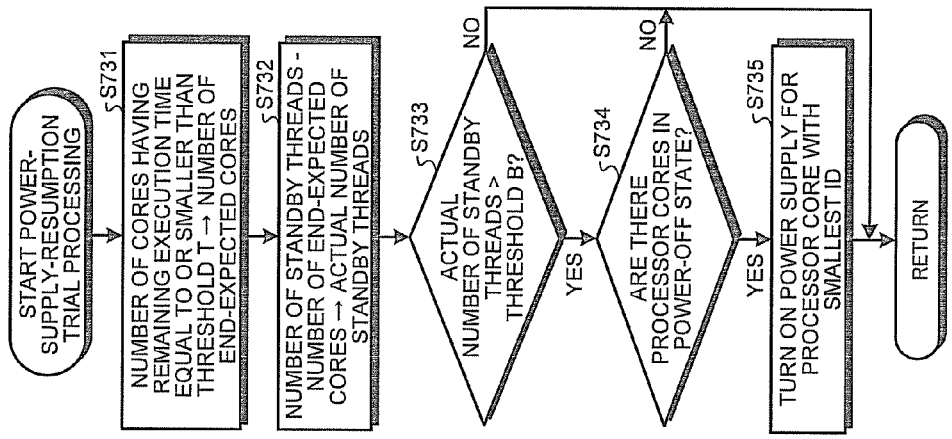
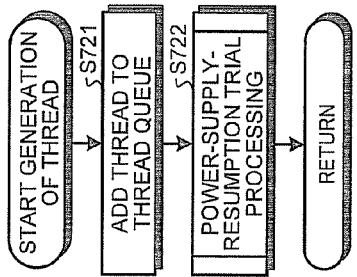
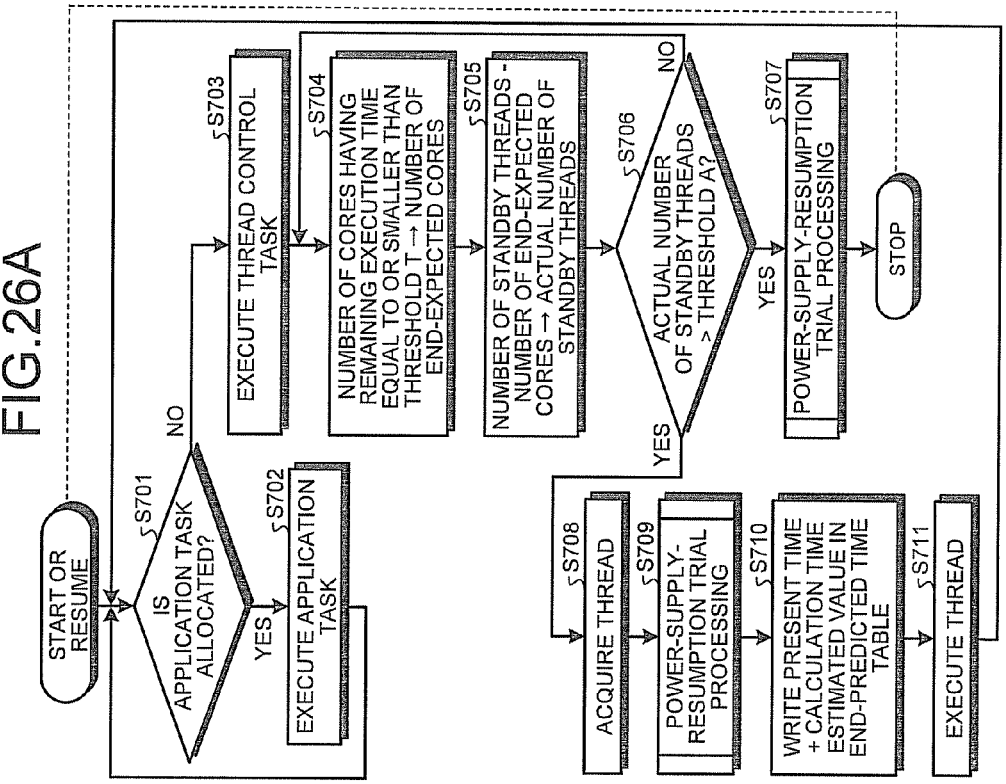

MULTI-CORE PROCESSOR SYSTEM WITH THREAD QUEUE BASED POWER MANAGEMENT

CROSS-REFERENCE TO RELATED APPLICATIONS

This application is based upon and claims the benefit of priority from the prior Japanese Patent Application No. 2009-123294, filed on May 21, 2009; the entire contents of which are incorporated herein by reference.

BACKGROUND OF THE INVENTION

1. Field of the Invention

The present invention relates to a multi-core processor system.

2. Description of the Related Art

In the past, some built-in multi-core processor has a function of turning on and off a power supply for each of processor cores to reduce power consumption.

For example, according to the technology disclosed in Japanese Patent Application Laid-Open No. 2008-129846, a packet processing processor performs packet processing based on a queue access function and a queue monitoring processor execute power supply control for the packet processing processor based on an amount of data stored in a queue of the packet processing processor. According to the technology disclosed in Japanese Patent Application Laid-Open No. H8-6681, a system-state monitoring unit monitors a load state of a system and a system-state control unit controls power consumption of respective processor cores based on notification from the system-state monitoring unit.

However, according to these related arts, a processor core or dedicated hardware for monitoring a load state of the system and performing the power supply control have to be prepared, leading to an increase in cost.

BRIEF SUMMARY OF THE INVENTION

A multi-core processor system according to an embodiment of the present invention comprises: a plurality of processor cores; a power supply unit that stops supplying or supplies power to each of the processor cores individually; and a thread queue that stores threads that the multi-core processor system causes the processor cores to execute, wherein each of the processor cores includes: a power-supply stopping unit that causes the power supply unit to stop power supply to an own processor core when a number of threads stored in the thread queue is equal to or smaller than a first threshold; and a power-supply resuming unit that causes the power supply unit to resume power supply to the other stopped processor cores when the number of threads stored in the thread queue exceeds a second value equal to or lager than the first threshold.

A multi-core processor system according to an embodiment of the present invention comprises: a plurality of processor cores; a power supply unit that stops supplying or supplies power to each of the processor cores individually; and a thread queue that stores threads that the multi-core processor system causes the processor cores to execute, wherein each of the processor cores includes: a power-supply stopping unit that causes the power supply unit to stop power supply to an own processor core when a resource of an own processor core satisfies none of resource requests of threads stored in the thread queue; and a power-supply resuming unit that causes, when there is a processor core having a resource that satisfies the resource requests of the threads stored in the thread queue among the other stopped processor cores the power supply unit to resume power supply to the other processor core.

A multi-core processor system according to an embodiment of the present invention comprises: a plurality of processor cores; a power supply unit that stops supplying or supplies power to each of the processor cores individually; a timer; a thread queue that stores, together with calculation time information indicating time necessary for execution, threads that the multi-core processor system causes the processor cores to execute; and a thread-end-predicted time table that records end-predicted time of a thread being executed by each of the processor cores, wherein each of the processor cores includes: an end-predicted-time recording unit that calculates, when a thread is acquired from the thread queue, end-predicted time of the acquired thread based on the calculation time information stored in the thread queue and a value of the timer and writes the calculated end-predicted time in the thread-end-predicted time table; a power-supply stopping unit calculates, based on the thread-end-predicted time table and the value of the timer, a number of end-expected cores as a number of processor cores that are expected to end thread execution soon and causes the power supply unit to stop power supply to an own processor core when a value obtained by subtracting the calculated number of end-expected cores from a number of threads stored in the thread queue is equal to or smaller than a first threshold; and a power-supply resuming unit that causes the power supply unit to resume power supply to the other stopped processor cores when the value obtained by subtracting the calculated number of end-expected cores from the number of threads stored in the thread queue exceeds a second threshold equal to or larger than the first threshold.

BRIEF DESCRIPTION OF THE DRAWINGS

FIG. 6 is a diagram of the configuration of a multi-core processor system according to a second embodiment of the present invention;

FIG. 7 is a diagram for explaining an example of a core-power-off time table;

FIG. 8 is a diagram for explaining functions generated in the processor core;

FIGS. 9A to 9C are flowcharts for explaining the operation of the processor core according to the second embodiment;

FIGS. 11A to 11C are flowcharts for explaining the operation of a processor core according to the third embodiment;

FIG. 12 is a diagram for explaining changes in states of thread execution cores;

FIG. 13 is a diagram for explaining the operation of the multi-core processor system;

FIGS. 14A to 14C are flowcharts for explaining the operation of the processor core according to the third embodiment;

FIG. 16 is a diagram for explaining an example of the data structure of a request resource list;

FIG. 17 is diagram for explaining an example of the data structure of a processor-core resource list;

FIGS. 18A to 18C are flowcharts for explaining the operation of a processor core according to the fourth embodiment;

FIGS. 26A to 26C are flowcharts for explaining the operation of the processor core according to the sixth embodiment.

DETAILED DESCRIPTION OF THE INVENTION

Exemplary embodiments of a multi-core processor system according to the present invention will be explained below in detail with reference to the accompanying drawings. The present invention is not limited to the following embodiments.

Figure 1:
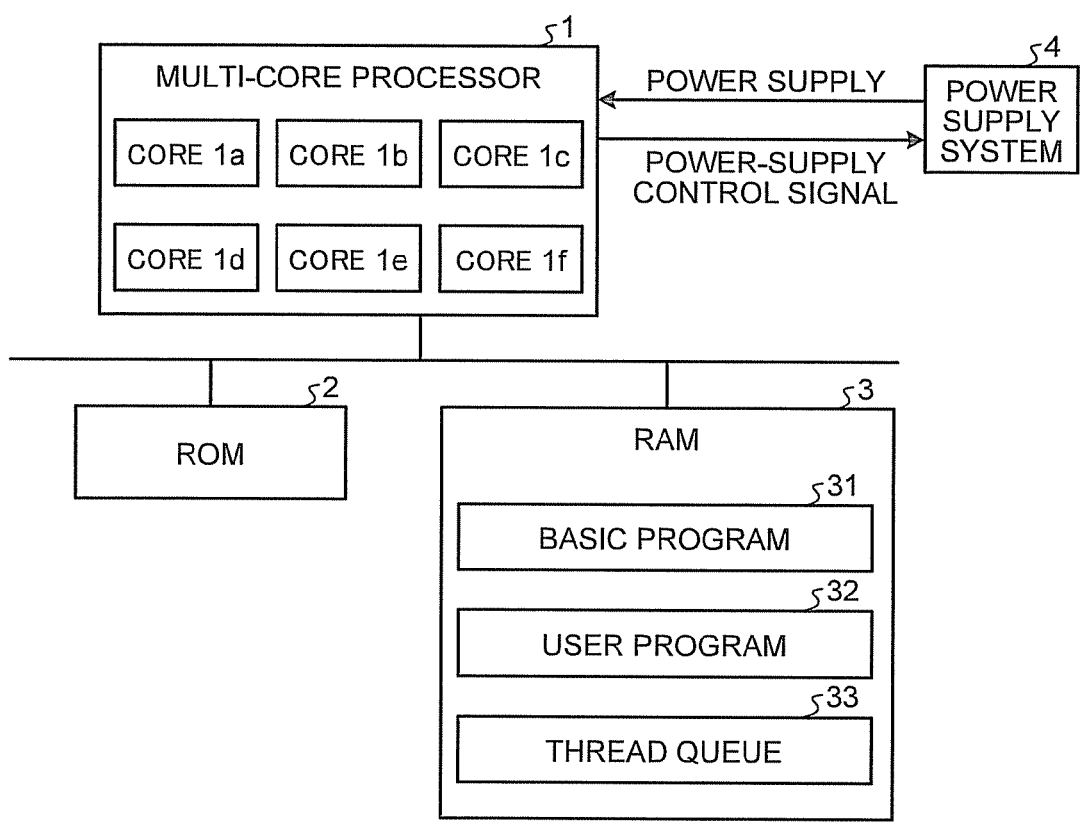
FIG. 1 is a diagram of the configuration of a multi-core processor system according to a first embodiment of the present invention.

FIG. 1 is a block diagram of the configuration of a multi-core processor system according to a first embodiment of the present invention. The multi-core processor system according to the first embodiment includes a multi-core processor 1, a read only memory (ROM) 2, a random access memory (RAM) 3, and a power supply system 4. The multi-core processor 1, the ROM 2, and the RAM 3 are connected to one another via a bus.

The multi-core processor 1 includes a plurality of (six) processor cores 1a, 1b, 1c, 1d, 1e, and 1f. In the figure, the processor cores are simply referred to as cores. Each of the processor cores 1a to 1f included in the multi-core processor 1 individually accesses, based on a basic program 31 explained later, the power supply system 4 and transmits a signal for stopping the supply of power to the processor core and a signal for supplying power to the other stopped processor cores to the power supply system 4. The power supply system 4 stops supplying or supplies power to each of the processor cores 1a to 1f individually based on the signal for stopping the supply of power or supplying power (power supply control signals) received from the processor cores 1a to 1f. In the following explanation, "stopping power supply to the processor cores 1a to 1f" may be simply represented as "turning off power supplies for the processor cores 1a to 1f". Further, "supplying power to the processor cores in a power-off state" may be simply represented as "turning on power supplies for the processor cores".

A user program 32 is a computer program prepared for an application of the multi-core processor system. A basic program 31 is a computer program for providing basic processing necessary for executing the user program 32 on the multi-core processor system. The user program 32 and the basic program 31 are stored in the ROM 2 and loaded to the RAM 3 via the bus. The multi-core processor 1 executes the user program 32 based on the basic program 31 loaded to the RAM 3.

Figure 2:
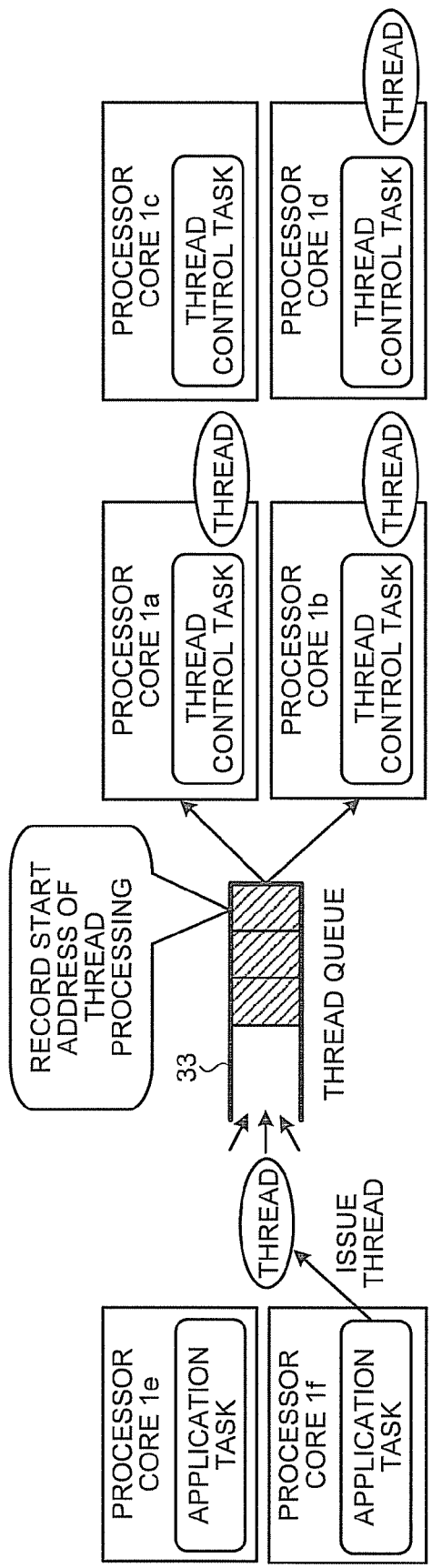
FIG. 2 is a schematic diagram for explaining a state of execution of a user program.

FIG. 2 is a schematic diagram for explaining a state in which the processor cores 1a to 1f are executing the user program 32. The processor core 1e and the processor core 1f execute an application task generated by the user program 32. The application task issues threads based on the user program 32. The generated threads are put in an execution waiting state and stored (accumulated) in a thread queue. The thread queue is stored in the RAM 3 as a thread queue 33. The threads stored in the thread queue may be represented as standby threads. The thread queue outputs and inputs the threads put on standby according to the first-in first-out (FIFO) rule. In the processor cores 1a to 1d that are not executing the application task, a thread control task as a task for executing the generated threads is operating. The thread control task is a task generated by the basic program 31 as a part of basic processing. The thread control task operating in the processor cores 1a to 1d acquires a thread from the thread queue 33 and, when the execution of the thread ends, acquires another thread from the thread queue 33.

Figures 3, 4:
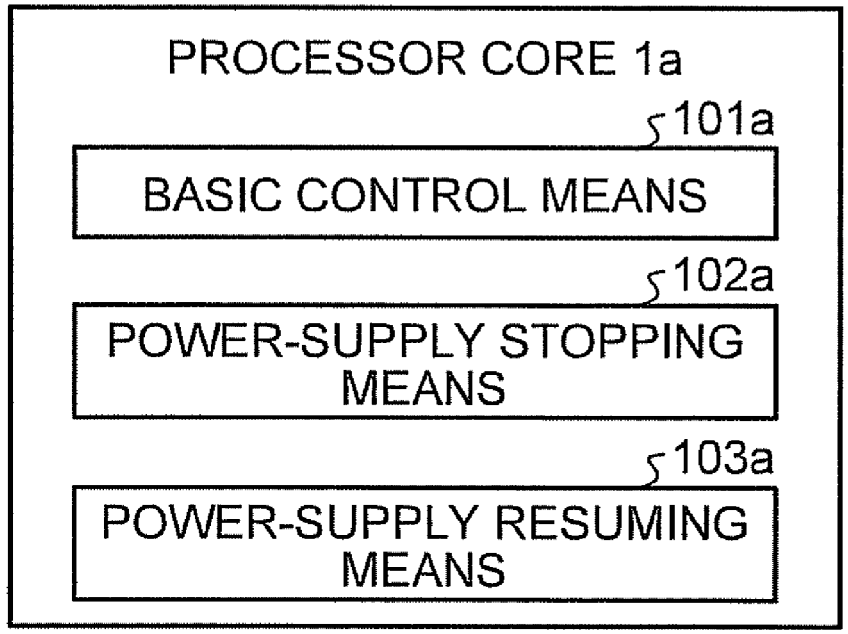
FIG. 3 is a diagram for explaining the data structure of a thread queue 33.
FIG. 4 is a diagram for explaining functions generated in a processor core.

FIG. 3 is a diagram for explaining the data structure of the thread queue 33. Each of the threads stored in the thread queue 33 includes an ID for identifying the thread and a thread processing start address as a start address of a relevant section in the user program loaded to the RAM 3. The thread control task extracts a relevant computer program from the thread processing start address and executes the computer program.

FIG. 4 is a diagram for explaining functions generated by the processor core 1a executing the basic program 31. The basic program 31 generates basic control means 101a, power-supply stopping means 102a, and power-supply resuming means 103a. The basic control means 101a starts the application task and the thread control task. The power-supply stopping means 102a is implemented in the thread control task. When there is no standby thread in the thread queue 33, the power-supply stopping means 102a transmits a power-supply control signal for turning off a power supply for the processor 1a to the power supply system 4. When the application task or a thread operating in the processor core 1a generates a thread anew, i.e., when a standby thread is stored in the thread queue 33, the power-supply resuming means 103a executes a trial for turning on power supplies for the other processor cores (power-supply-resumption trial processing). The processor cores 1b to 1f respectively generate, based on the basic program 31, functions same as those generated by the processor cores 1a explained above. However, explanation concerning the functions related to the processor cores 1b to 1f is omitted to avoid repetition of the explanation.

Figure 5C:
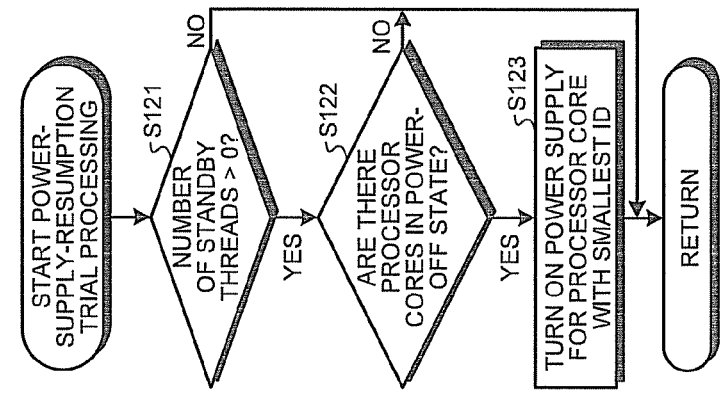
FIGS. 5A to 5C are flowcharts for explaining the operation of the processor core according to the first embodiment.
Figure 5B:
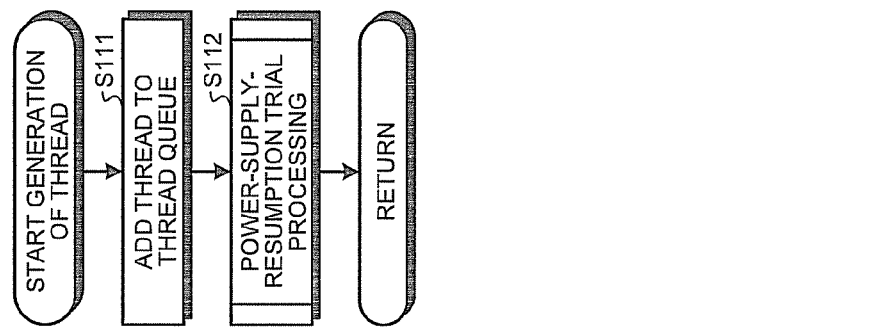
Figure 5A:
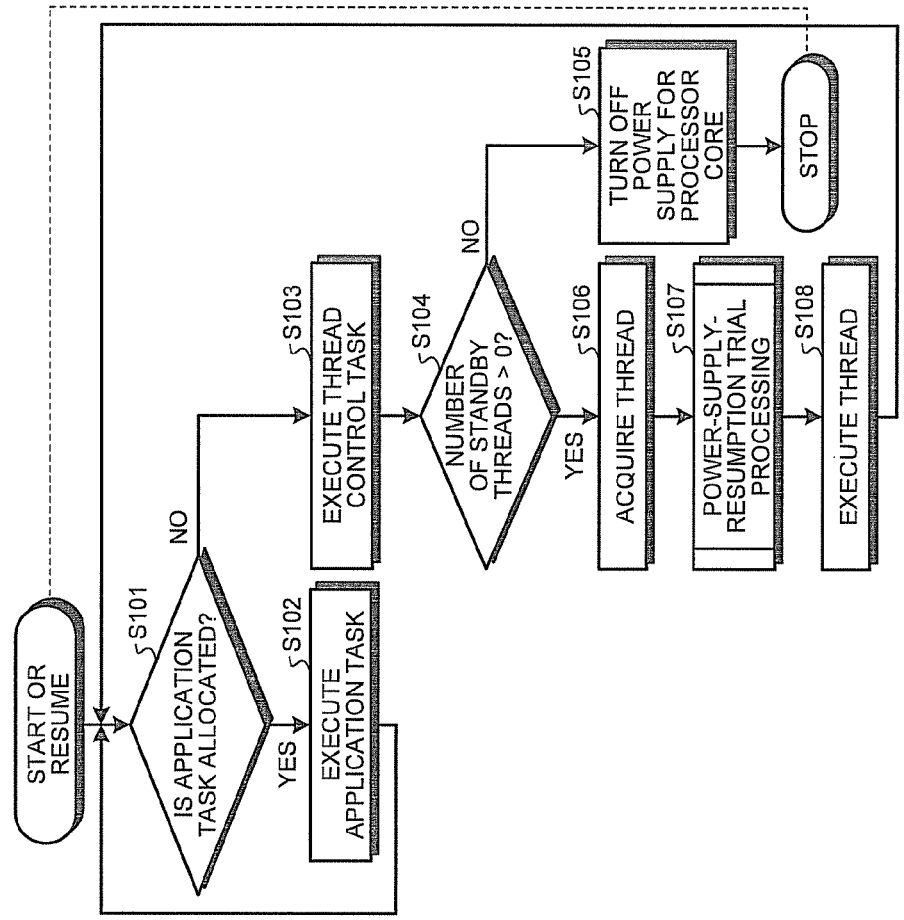

FIGS. 5A to 5C are flowcharts for explaining the operation of the processor cores 1a to 1f. The processor cores 1a to 1f can execute the same operation. Therefore, only the operation of the processor core 1a is explained below as a representative of the operation of the processor cores 1a to 1f.

As shown in FIG. 5A, first, the basic control means 101a determines whether the application task is allocated to the processor core 1a (S101). When the application task is allocated ("Yes" at S101), the basic control means 101a executes the application task (S102). When the application task is executed, the processor core 1a generates a thread. When the processor core 1a ends the execution of the application task, the operation shifts to S101.

When it is determined that the application task is not allocated ("No" at S101), the basic control means 101a starts and executes the thread control task (S103). The thread control task determines, referring to the thread queue 33, whether the number of standby threads exceeds zero, i.e., the number of standby threads is equal to or larger than one (S104). When there is no standby thread ("No" at S104), the thread control task transmits a power-supply control signal for turning off the power supply for the processor core 1a to the power supply system 4 and turns off the power supply (S105) and stops the operation. After the operation is stopped, when power supply is resumed by the power-supply-resumption trial processing, the basic control means 101a starts the operation from S101 again.

When the number of standby threads exceeds zero, i.e., the number of standby threads is equal to or larger than one ("Yes" at S104), the thread control task acquires a thread from the thread queue 33 (S106). Then, the power-supply resuming means 103a executes the power-supply-resumption trial processing (S107). The thread control task executes the acquired thread (S108). When the thread control task completes the execution of the thread, the operation shifts to S101.

When the application task is executed (S102), the processor core 1a may generate a new thread. When the thread is executed (S108), the processor core 1a may also generate a new thread. FIG. 5B is a flowchart for explaining the operation of the processor core 1a during thread generation. When the processor core 1a generates a new thread, the processor core 1a adds the generated thread to the thread queue 33 (S111). Then, the power-supply resuming means 103a executes the power-supply-resumption trial processing (S112) and the operation returns to the start.

FIG. 5C is a flowchart for explaining in detail the power-supply-resumption trial processing executed at S107 and 5112. When the power-supply-resumption trial processing is started, the power-supply resuming means 103a determines whether the number of standby threads exceeds zero (S121). When the number of standby threads is equal to or larger than one ("Yes" at S121), the power-supply resuming means 103a further determines whether there are processor cores in the power-off state (S122). When there are processor cores in the power-off state ("Yes" at S122), the power-supply resuming means 103a transmits a power-supply control signal for turning on a power supply for a processor core having a smallest ID number among the processor cores in the power-off state to the power supply system 4 and turns on the power supply for the processor core (S123). The operation of the power-supply-resumption trial processing returns to the start. The ID number is an identifier for identifying each of the processor cores 1a to 1f. When the number of standby threads is not equal to or larger than one ("No" at S121) or there is no processor core in the power-off state ("No" at S122), the operation of the power-supply-resumption trial processing directly returns to the start.

In the above explanation, for simplification of the explanation, it is assumed that there is only one thread queue 33. However, if the thread control task is extended to check all thread queues, the thread control task can be applied to a plurality of thread queues 33. In the explanation of the operation of the power-supply-resumption trial processing, the power supply for one processor core is turned on at S123. However, power supplies for a plurality of processor cores can be turned on at a time.

As explained above, according to the first embodiment, each of the processor cores includes the power-supply stopping means for causing, when the number of standby threads is zero, the power supply system 4 to stop power supply to the processor and the power-supply resuming means for causing, when the number of standby threads exceeds zero, the power supply system 4 to resume power supply to the other stopped processor cores. This makes it possible to turn on and off power supplied to the processor cores according to a load state without preparing a processor and hardware exclusively used for power supply control.

According to the first embodiment, rather than the user program, the basic program generates the power-supply stopping means and the power-supply resuming means. Therefore, a user can avoid the necessity of describing processing for turning on and off the processor core power supplies in the user program.

According to the configuration of the first embodiment, in the power-supply-resumption trial processing, the processor core turns on the power supply for the processor core in the power-off state when the number of standby threads exceeds zero (i.e., equal to or larger than 1). Therefore, when the number of standby threads is frequently zero, the power supply is frequently turned on and off. However, an electric current based on a capacitor to which power is supplied flows when the processor core shifts from the power-on state to the power-off state and from the power-off state to the power-on state. Therefore, the frequency of power-on and power-off is desirably not so high from the viewpoint of a reduction in power consumption. Therefore, in a second embodiment of the present invention, a power supply is allowed to be turned on when time equal to or longer than a predetermined time has elapsed after the power supply is turned off.

FIG. 6 is a diagram for explaining the configuration of a multi-core processor system according to the second embodiment. In the multi-core processor system according to the second embodiment, a timer 5 that measures time is added to the configuration of the first embodiment. The RAM 3 stores a core-power-off time table 34 in which time when power supply is stopped is recorded for each of processor cores.

FIG. 7 is a diagram for explaining an example of the core-power-off time table 34. According to FIG. 7, the core-power-off time table 34 indicates that power supply to processor cores with core IDs (ID numbers of processor cores) 0 and 1 is turned off at time "0" and power supply to a processor core with a core ID 2 is turned off at time "123400". The time can be recorded in any unit, for example, the number of cycles after the timer 5 is started.

In the multi-core processor system according to the second embodiment, a basic program 35 is loaded to the RAM 3. FIG. 8 is a diagram for explaining functions generated by the processor core 1a executing the basic program 35. The processor core 1a generates power-supply stopping means 104a and power-supply resuming means 105a besides the basic control means 101a same as that in the first embodiment. The power-supply stopping means 104a is implemented in a thread control task. When the thread queue 33 stores no thread that should be acquired, the power-supply stopping means 104a acquires present time referring to the timer 5, records a core ID of the processor core 1a and the acquired present time in the core-power-off time table 34, and transmits a power control signal for turning off a power supply for the processor 1a to the power supply system 4. When the application task or a thread operating in the processor core 1a generates a thread anew, the power-supply resuming means 105a executes the power-supply-resumption trial processing. In executing the power-supply-resumption trial processing, the power-supply resuming means 105a turns on, referring to the timer 5 and the core-power-off time table 34, a power supply for a processor core in which elapsed time from the power-off state to the present is equal to or longer than a predetermined time (an ON prohibition period) set in advance among processor cores in the power-off state. The processor cores 1b to 1f respectively generate, based on the basic program 35, functions same as those generated by the processor cores 1a explained above. However, explanation concerning the functions related to the processor cores 1b to 1f is omitted to avoid repetition of the explanation.

FIGS. 9A to 9C are flowcharts for explaining the operation of the multi-core processor system according to the second embodiment. The processor cores 1a to 1f can execute the same operation. Therefore, only the operation of the processor core 1a is explained below as a representative of the operation of the processor cores 1a to 1f.

As shown in FIG. 9A, first, the basic control means 101a determines whether the application task is allocated to the processor core 1a (S201). When the application task is allocated ("Yes" at S201), the basic control means 101a executes the application task (S202). When the application task is executed, the processor core 1a generates a thread. When the processor core 1a ends the execution of the application task, the operation shifts to S201.

When it is determined that the application task is not allocated ("No" at S201), the basic control means 101a starts and executes the thread control task (S203). The thread control task determines, referring to the thread queue 33, whether the number of standby threads exceeds zero (S204). When the number of standby threads does not exceed zero, i.e., there is no standby thread ("No" at S204), the thread control task acquires present time referring to the timer 5 (S205) and records the core ID of the processor core 1a and the acquired present time in the core-power-off time table 34 (S206). The thread control task transmits a power-supply control signal for interrupting the power supply for the processor core 1a to the power supply system 4, turns off the power supply (S207), and stops the operation.

When the number of standby threads exceeds zero, i.e., the number of standby threads is equal to or larger than one ("Yes" at S204), the thread control task acquires a thread from the thread queue 33 (S208). Then, the power-supply resuming means 105a executes the power-supply-resumption trial processing (S209). The thread control task executes the acquired thread (S210). When the thread control task completes the execution of the thread, the operation shifts to S201.

When the application task is executed (S202), the processor core 1a may generate a new thread. When the thread is executed (S210), the processor core 1a may also generate a new thread. FIG. 9B is a flowchart for explaining the operation of the processor core 1a during thread generation. When the processor core 1a generates a new thread, the processor core 1a adds the generated thread to the thread queue 33 (S221). Then, the power-supply resuming means 105a executes the power-supply-resumption trial processing (S222) and the operation returns to the start.

FIG. 9C is a flowchart for explaining in detail the power-supply-resumption trial processing executed at S209 and S222. When the power-supply-resumption trial processing is started, the power-supply resuming means 105a determines whether the number of standby threads exceeds zero, i.e., equal to or larger than one (S231). When the number of standby threads is equal to or larger than one ("Yes" at S231), the power-supply resuming means 105a selects one processor core in the power-off state (S232). An ID number of the processor core in the power-off state selected by the power-supply resuming means 105a is represented as "i". Subsequently, the power-supply resuming means 105a acquires present time from the timer 5 and acquires stop time of the processor core with the ID number "i" from the core-power-off time table 34. The power-supply resuming means 105a compares the present time and the stop time of the processor core to thereby determine whether time equal to or longer than the On prohibition time has elapsed from the stop time of the processor core (S233). When time equal to or longer than the ON prohibition time has elapsed ("Yes" at S233), the power-supply resuming means 105a transmits a power-supply control signal for turning on a power supply for the processor core with the ID number "i" to the power supply system 4 and turns on the power supply for the processor core (S234). The operation of the power-supply-resumption trial processing returns to the start.

When time equal to or longer than the ON prohibition period has not elapsed ("No" at S233), the power-supply resuming means 105a determines whether all processor cores in the power-off state are selected (S235). When all the processor cores in the power-off state are selected ("Yes" at S235), the operation of the power-supply-resumption trial processing returns to the start. When unselected processor cores remain ("No" at S235), the power-supply resuming means 105a shifts to S232 and further selects one processor core out of the unselected processor cores. The order of selection of the processor cores can be any order. For example, the processor cores with small ID numbers are preferentially selected.

As explained above, according to the second embodiment, when the number of standby threads exceeds zero, the power-supply resuming means resumes power supply to a processor core in which the predetermined time (the ON prohibition period) has elapsed from time of power-off recorded in the core-power-off time table 34 among stopped processor cores. This makes it possible to prevent the power supplies for the processor cores from being frequently turned on and off. Because a large current flows when the power supplies for the processor cores are turned on and off, it is possible to realize a reduction in power consumption by avoiding frequent power-on and power-off.

According to the second embodiment explained above, it is likely that the multi-core processor system fails in power-on of a processor core during thread issuance. Therefore, it is anticipated that a follow-up ability to an increase in a load is deteriorated. To avoid the deterioration in the follow-up ability, the power-supply-resumption trial processing can be executed in each fixed period in operating cores.

In a third embodiment of the present invention, whether a power supply for an own processor core should be turned off and whether power supplies for the other processor cores should be turned on are determined according to whether the number of standby threads exceeds different thresholds set in advance rather than whether the number of standby threads is zero. Components of the third embodiment are the same as those in the first embodiment. Therefore, the third embodiment is explained with reference to the diagram shown in FIG. 1. Functions generated by the processor cores 1a to 1f according to the third embodiment are substantially the same as those in the first embodiment except that thresholds used for determination for power-on and power-off are different. Therefore, FIG. 4 is used as a diagram for explaining a functional configuration of the third embodiment.

Figure 10:
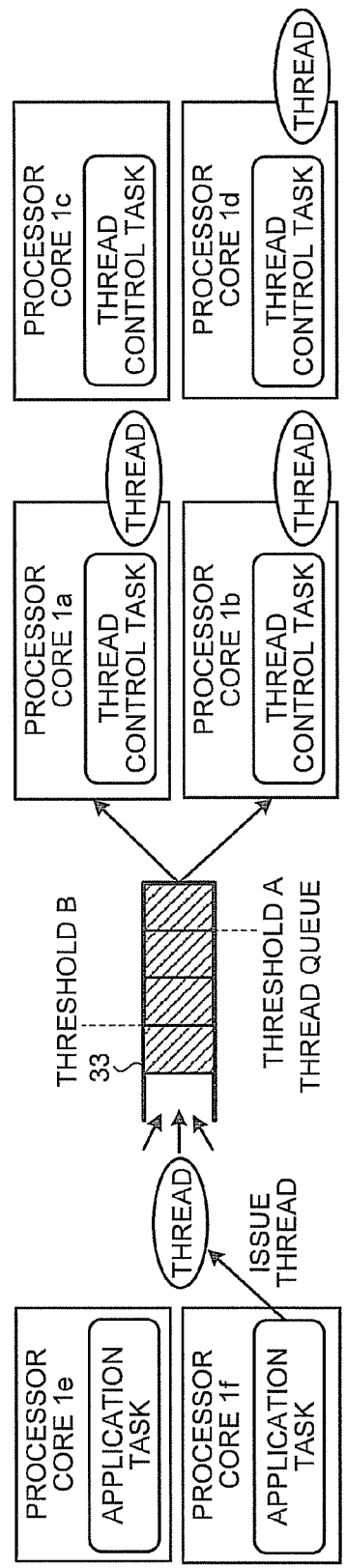
FIG. 10 is a schematic diagram for explaining characteristics of a multi-core processor system according to a third embodiment of the present invention.

FIG. 10 is a schematic diagram for explaining characteristics of a multi-core processor system according to the third embodiment. The processor cores 1e and 1f are executing the application task, respectively generate threads based on the application task, and add the generated threads to the thread queue 33. The processor cores 1a to 1d are executing the thread control task. The processor cores 1a to 1d extract threads from the thread queue 33 and execute the threads. Two kinds of thresholds (thresholds A and B) are set concerning the number of threads put on standby in the thread queue 33. The thread control task turns off a power supply for an own processor core when the number of standby threads does not exceeds the threshold A. Even when the number of standby threads does not exceed the threshold A, when the number of standby threads is equal to or larger than one and no other processor core is executing a thread, as exceptional processing, the thread control task does not turn off the power supply for the own processor core. When the number of standby threads exceeds the threshold B and there are other processor cores in the power-off state, the power-supply resuming means 103*a* turns on power supplies for the processor cores. The thresholds are set to satisfy a relation the threshold B>the threshold A≧0. In FIG. 10, the threshold A is 1 and the threshold B is 3.

FIGS. 11A to 11C are flowcharts for explaining the operation of the processor cores 1*a* to 1*f*. The processor cores 1*a* to 1*f* can execute the same operation. Therefore, only the operation of the processor core 1*a* is explained as a representative of the operation of the processor cores 1*a* to 1*f*.

As shown in FIG. 11A, first, the basic control means 101*a* determines whether the application task is allocated to the processor core 1*a* (S301). When the application task is allocated ("Yes" at S301), the basic control means 101*a* executes the application task (S302). When the application task is executed, the processor core 1*a* generates a thread. When the processor core 1*a* ends the execution of the application task, the operation shifts to S301.

When it is determined that the application task is not allocated ("No" at S301), the basic control means 101*a* starts and executes the thread control task (S303). The thread control task determines, referring to the thread queue 33, whether the number of standby threads exceeds the threshold A (S304). When the number of standby threads is equal to or smaller than the threshold A ("No" at S304), the thread control task determines whether a condition that there is no other processor core that is executing a thread and there are standby threads is satisfied (S305). When the condition is not satisfied ("No" at S305), the thread control task transmits a power-supply control signal for turning off the power supply for the processor core 1*a* to the power supply system 4, turns off the power supply for the processor core 1*a* (S306), and stops the operation.

When the number of standby threads exceeds the threshold A ("Yes" at S304) and when the determination condition at S305 is satisfied ("Yes" at S305), the thread control task acquires a thread from the thread queue 33 (S307). Then, the power-supply resuming means 103*a* executes the power-supply-resumption trial processing (S308). The thread control task executes the acquired thread (S309). When the thread control task completes the execution of the thread, the operation shifts to S301.

When the application task is executed (S302), the processor core 1*a* may generate a new thread. When the thread is executed (S309), the processor core 1*a* may also generate a new thread. FIG. 11B is a flowchart for explaining the operation of the processor core 1*a* during thread generation. When the processor core 1*a* generates a new thread, the processor core 1*a* adds the generated thread to the thread queue 33 (S311). Then, the power-supply resuming means 103*a* executes the power-supply-resumption trial processing (S312) and the operation returns to the start.

FIG. 11C is a flowchart for explaining in detail the power-supply-resumption trial processing executed at S308 and S312. When the power-supply-resumption trial processing is started, the power-supply resuming means 103*a* determines whether the number of standby threads exceeds the threshold B (S321). When the number of standby threads exceeds the threshold B ("Yes" at S321), the power-supply resuming means 103*a* further determines whether there are processor cores in the power-off state (S322). When there are processor cores in the power-off state ("Yes" at S322), the power-supply resuming means 103*a* transmits a power-supply control signal for turning on a power supply for a processor core having a smallest ID number among the processor cores in the power-off state to the power supply system 4 and turns on the power supply for the processor core (S323). The operation of the power-supply-resumption trial processing returns to the start. When the number of standby threads does not exceed the threshold B ("No" at S321) or when there is no processor core in the power-off state ("No" at S322), the operation of the power-supply-resumption trial processing directly returns to the start.

FIG. 12 is a diagram for explaining a change in a state of thread executing cores that occurs when a value of the threshold A is set to two and a value of the threshold B is set to six. It is assumed that, first, three threads are put on standby in the thread queue 33 and the two processor cores 1*a* and 1*b* are executing the threads. In the figure, a state of the thread execution core is not shown. First, at time 1000, the application task adds four threads to the thread queue 33. This increases the number of standby threads to eight. Because the number of standby threads exceeds the threshold B, first, the processor core 1*c* is started and the processor core 1*d* is started by the operation of the power-supply resuming means of the processor core 1*c*. Thereafter, until time 5000, the four processor cores 1*a* to 1*d* sequentially acquire and execute threads. At time 6000, because the number of standby threads is equal to or smaller than the threshold A, the thread control task of the processor core 1*a* turns off the power supply for the processor core 1*a*, i.e., stops the processor core 1*a* without acquiring threads. At time 7000, the application task adds three threads to the thread queue 33. Although the number of standby threads increases to five, power-on of the processor core 1 is not performed because the number of standby threads does not exceed the threshold B. Thereafter, until time 10000, the three processor cores 1*b* to 1*d* sequentially acquire and execute threads. At time 11000 and 12000, because the number of standby threads decreases to be equal to or smaller than the threshold A, processor cores 1*b* and 1*c* stop. At time 13000, the execution of the thread ends in the processor core 1*d*. However, because the processor core 1*d* is a last thread execution core and threads remain in the thread queue 33, the thread control task of the processor core 1*d* performs acquisition and execution of threads without stopping the processor core 1*d*. At time 15000, the execution of the last thread ends in the processor core 1*d*. The thread control task of the processor core 1*d* stops the processor core 1*d*.

As explained above, according to the third embodiment, the multi-core processor system includes the power-supply stopping means for causing the power supply system 4 to stop power supply to the own processor core when the number of standby threads is equal to or smaller than the threshold A (a first threshold) and the power-supply resuming means for causing, when the number of standby threads exceeds the threshold B (a second threshold) as a value exceeding the threshold A, the power supply system 4 to resume power supply to the other stopped processor cores. This makes it possible to prevent the power supplies for the processor cores from being frequently turned on and off.

In the above explanation, the thresholds are set to satisfy a relation the threshold B>the threshold A≧0. However, in the case of the threshold A=the threshold B=0, the third embodiment is substantially the same as the first embodiment. In the case of the threshold B=the threshold A>0, although it is impossible to prevent the power supplies from being frequently turned on and off, it is possible to obtain effects same as those in the first embodiment.

By extending the third embodiment, the threshold A and the threshold B can be increased or reduced according to an increase or decrease in the number of processor cores that are executing threads. FIG. 13 is a schematic diagram for explaining the operation of the multi-core processor system performed when the threshold A and the threshold B are increased or reduced according to the number of processor cores that are executing threads. In FIG. 13, when the number of processor cores that are executing threads is equal to or smaller than one, a value of the threshold A is zero, when the number of processor cores is two, the value of the threshold A is two, and, when the number of processor cores is equal to or larger than three, the value of the threshold A is three. In this way, the value of the threshold A is increased according to an increase in the number of processor cores that are executing threads. When the number of processor cores that are executing threads is zero, a value of the threshold B is zero, when the number of processor cores is one, the value of the threshold B is three, when the number of processor cores is two, the value of the threshold B is five, and, when the number of processor cores is equal to or larger than three, the value of the threshold B is seven. In this way, the value of the threshold B is increased according to an increase in the number of processor cores that are executing threads.

FIGS. 14A to 14C are flowcharts for explaining operation performed when the threshold A and the threshold B are increased or decreased according to an increase or decrease in the number of processor cores that are executing threads. As shown in FIG. 14A, first, the basic control means 101a determines whether the application task is allocated to the processor core 1a (S401). When the application task is allocated ("Yes" at S401), the basic control means 101a executes the application task (S402). When the application task is executed, the processor core 1a generates a thread. When the processor core 1a ends the execution of the application task, the operation shifts to S401.

When it is determined that the application task is not allocated ("No" at S401), the basic control means 101a starts and executes the thread control task (S403). The thread control task determines, referring to the thread queue 33, whether the number of standby threads exceeds the threshold A decided according to the number of processor cores that are executing threads at that point (S404). When the number of standby threads does not exceed the threshold A ("No" at S404), the thread control task transmits a power-supply control signal for turning off the power supply for the processor core 1a to the power supply system 4 and turns off the power supply (S405) and stops the operation. When the number of standby threads exceeds the threshold A ("Yes" at S404), the thread control task acquires a thread from the thread queue 33 (S406). Then, the power-supply resuming means 103a executes the power-supply-resumption trial processing (S407). The thread control task executes the acquired thread (S408). When the thread control task completes the execution of the thread, the operation shifts to S401.

FIG. 14B is a flowchart for explaining the operation of the processor core 1a performed when a thread is generated by execution of the application task or a thread. When the processor core 1a generates a new thread, the processor core 1a adds the generated thread to the thread queue 33 (S411).

Then, the power-supply resuming means 103a executes the power-supply-resumption trial processing (S412). The operation returns to the start.

FIG. 14C is a flowchart for explaining the power-supply-resumption trial processing in detail. When the power-supply-resumption trial processing is started, the power-supply resuming means 103a determines whether the number of standby threads exceeds the threshold B decided according to the number of processor cores that are executing threads at that point (S421). When the number of standby threads exceeds the threshold B ("Yes" at S421), the power-supply resuming means 103a further determines whether there are processor cores in the power-off state (S422). When there are processor cores in the power-off state ("Yes" at S422), the power-supply resuming means 103a transmits a power-supply control signal for turning on a power supply for a processor core having a smallest ID number among the processor cores in the power-off state to the power supply system 4 and turns on the power supply for the processor core (S423). The operation of the power-supply-resumption trial processing returns to the start. When the number of standby threads does not exceed the threshold B ("No" at S421) or there is no processor core in the power-off state ("No" at S422), the operation of the power-supply-resumption trial processing directly returns to the start.

As explained above, when there are a large number of processor cores that are executing threads, the threshold A is increased to make it hard to turn on a power supply and, when there are only a small number of processor cores that are executing threads, the threshold B is reduced to make it easy to turn on a power supply. This makes it possible to further reduce the frequency of power-on and power-off of the processor cores.

In some case, a multi-core processor system having resources for each of processor cores is used. Therefore, according to a fourth embodiment of the present invention, threads having different request resources are respectively stored in different thread queues and the thread control task acquires a thread from a thread queue in which threads executable by an own processor core are stored.

Figure 15:
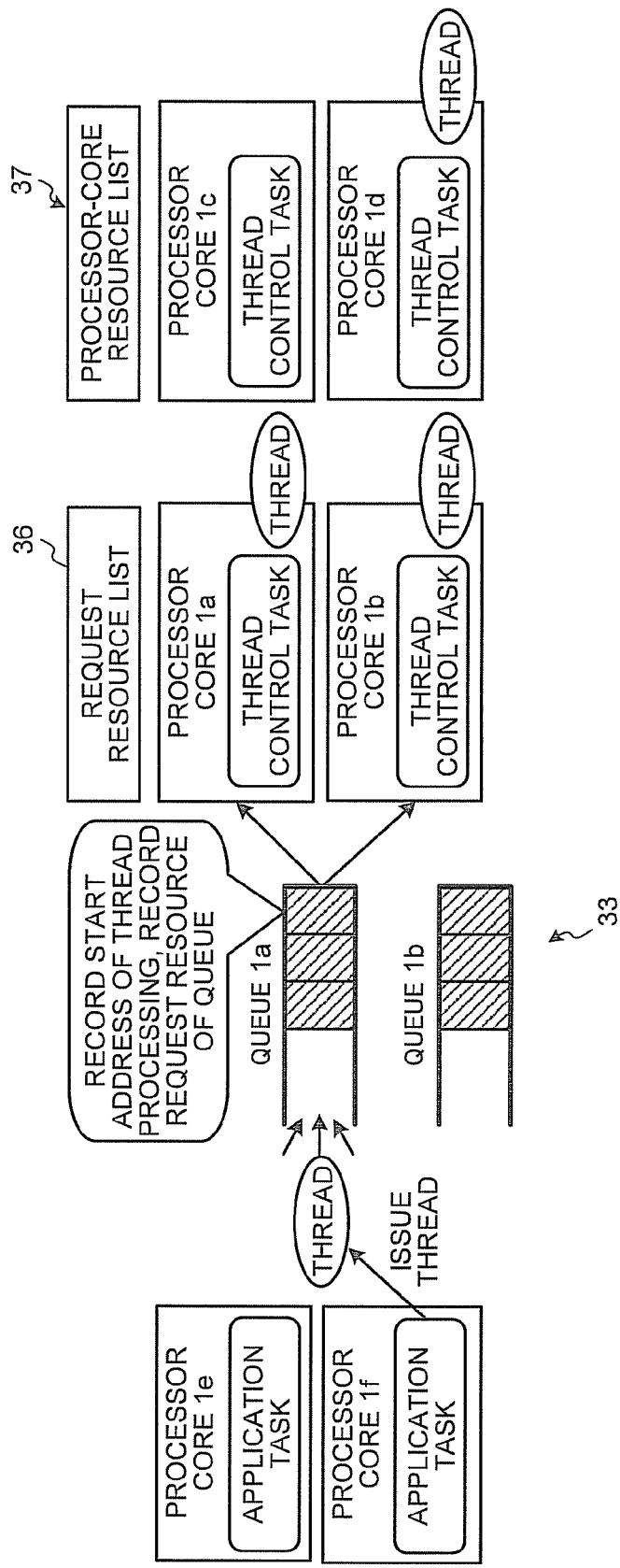
FIG. 15 is a schematic diagram for explaining the operation of a multi-core processor system according to a fourth embodiment of the present invention.

FIG. 15 is a schematic diagram for explaining the fourth embodiment. The thread queue 33 is divided into a plurality of (two) thread queues. A multi-core processor system according to the fourth embodiment includes a request resource list 36 in which a request resource for each of thread queues is described and a processor-core resource list 37 in which a resource for each of processor cores is described. A storage location of the request resource list 36 and the processor-core resource list 37 is not specifically limited. For example, the storage location is the RAM 3. Components of the multi-core processor system according to the fourth embodiment are the same as those of the first embodiment except the request resource list 36 and the processor-core resource list 37. Therefore, explanation concerning the components other than the request resource list 36 and the processor-core resource list 37 is omitted. In the following explanation, component names and reference numerals and signs are the same as those in the first embodiment. Functional components of the fourth embodiment are substantially the same as those of the first embodiment. Therefore, in the following explanation, functional component names and reference numerals and signs are same as those in the first embodiment.

FIG. 16 is a diagram for explaining an example of the data structure of the request resource list 36. In the request resource list 36, a queue ID as an identifier of each of thread queues and a request resource of a stored thread are associated. In this example, a processor core that executes a thread stored in a thread queue with a queue ID 0 is requested that a scratch pad memory has size of at least 4 kilobytes and can execute a multiplication instruction. A processor core that executes a thread stored in a thread queue with a queue ID 1 is requested that a scratch pad memory have size equal to or larger than 8 kilobytes.

FIG. 17 is a diagram for explaining an example of the data structure of the processor-core resource list 37. The processor-core resource list 37 indicates that the processor core with the core ID 0 has a scratch pad memory of 8 kilobytes and the processor core with the core ID 1 has a scratch pad memory of 4 kilobytes and can execute a multiplication instruction. According to the example shown in FIGS. 16 and 17, the processor core with the core ID 0 can execute a thread stored in a thread queue with a queue ID 1 and the processor core with the core ID 1 can execute a thread stored in a thread queue with a queue ID 0.

FIGS. 18A to 18C are flowcharts for explaining the operation of the processor cores 1a to 1f according to the fourth embodiment. The processor cores 1a to 1f can execute the same operation. Therefore, only the operation of the processor core 1a is explained below as a representative of the operation of the processor cores 1a to 1f.

As shown in FIG. 18A, first, the basic control means 101a determines whether the application task is allocated to the processor core 1a (S501). When the application task is allocated ("Yes" at S501), the basic control means 101a executes the application task (S502). When the application task is executed, the processor core 1a generates a thread. When the processor core 1a ends the execution of the application task, the operation shifts to S501.

When it is determined that the application task is not allocated ("No" at S501), the basic control means 101a starts and executes the thread control task (S503). The thread control task selects, referring to the request resource list 36 and the processor-core resource list 37, one thread queue in which a resource of the processor core 1a satisfies a request resource (S504). The thread control task determines whether there are standby threads in the selected thread queue (S505). When there is no standby thread ("No" at S505), the thread control task determines whether all thread queues in which the resource of the processor core 1a satisfies the request resource are selected (S506). When all the thread queues are not selected ("No" at S506), the thread control task shifts to S504 and selects one unselected thread queue. When all the thread queues are selected ("Yes" at S506), the power-supply resuming means 103a executes the power-supply-resumption trial processing (S507). The thread control task transmits a signal to the power supply system 4, causes the power supply system 4 to turn off the power supply for the processor core 1a (S508), and stops. When there is no thread queue in which the resource of the processor core 1a satisfies the request resource at S504, the operation skips S505 and shifts to S507.

When there are standby threads in the thread queue ("Yes" at S505), the thread control task acquires a thread from the selected thread queue (S509). Then, the power-supply resuming means 103a executes the power-supply-resumption trial processing (S510). The thread control task executes the acquired thread (S511). When the thread control task completes the execution of the thread, the operation shifts to S501.

When the application task is executed (S502), the processor core 1a may generate a new thread. When the thread is executed (S511), the processor core 1a may generate a new thread. FIG. 18B is a flowchart for explaining the operation of the processor core 1a during thread generation. When the processor core 1a generates a new thread, the processor core 1a adds the generated thread to the thread queue 33 (S521). Then, the power-supply resuming means 103a executes the power-supply-resumption trial processing (S522) and the operation returns to the start.

FIG. 18C is a flowchart for explaining in detail the power-supply-resumption trial processing. When the power-supply-resumption trial processing is started, the power-supply resuming means 103a selects one thread queue (S531) and determines whether there are standby threads in the selected thread queue (S532). When there is no standby thread ("No" at S532), the power-supply resuming means 103a further determines whether there are unselected thread queues (S533). When there are unselected thread queues ("No" at S533), the power-supply resuming means 103 shifts to S531 and further selects one thread queue out of the unselected thread queues.

When there are standby threads in the selected thread queue ("Yes" at S532), the power-supply resuming means 103a further determines, referring to the request resource list 36 and the processor-core resource list 37, whether there are stopped processor cores that satisfy a request of the selected thread queue (S534). When there is no stopped processor core that satisfies the request of the selected thread queue ("No" at S534), the operation shifts to S533. When there are stopped processor cores that satisfy the request of the selected thread queue ("Yes" at S534), the power-supply resuming means 103a transmits a signal to the power supply system 4 and turns on a power supply for a processor core with a smallest core ID among the stopped processor cores that satisfy the request of the selected thread queue (S535). The operation returns to the start. When all the thread queues are selected ("Yes" at S533), the operation also returns to the start.

As explained above, according to the fourth embodiment, the power-supply stopping means causes the power supply system to stop power supply to an own processor core when a resource of the processor core satisfies none of resource requests of threads put on standby. The power-supply resuming means resumes power supply to the processor core when there is a processor core having a resource that satisfies a resource request of a thread put on standby among the other stopped processor cores. Therefore, even in a so-called asynchronous multi-core processor system in which resources of processor cores are not the same, it is possible to turn on and off processor-core power supplies according to a load state without preparing a processor and hardware exclusively used for power supply control.

In the fourth embodiment, threads that request the same resource are stored in one thread queue. On the other hand, in a multi-core processor system according to a fifth embodiment of the present invention, threads that request different resources can be stored in one thread queue.

Figures 19, 20:
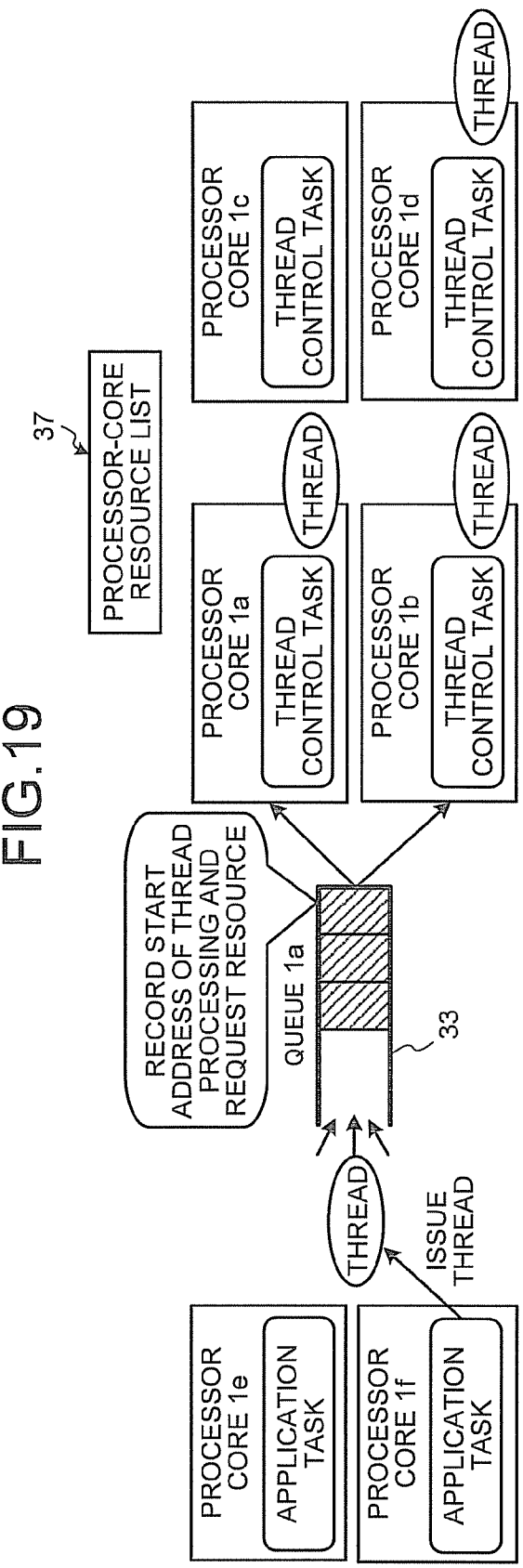
FIG. 19 is a schematic diagram for explaining a multi-core processor system according to a fifth embodiment of the present invention.
FIG. 20 is a diagram for explaining the data structure of a thread queue.

FIG. 19 is a schematic diagram for explaining the multi-core processor system according to the fifth embodiment. The multi-core processor system according to the fifth embodiment includes one thread queue 33 and the processor-core resource list 37 same as that in the fourth embodiment. A request resource is recorded in the thread queue 33 besides a start address of thread processing.

Components of the multi-core processor system according to the fifth embodiment are the same as those in the first embodiment except the data structure of the thread queue 33 and the structure of the processor-core resource list 37. Therefore, explanation concerning the components other than the thread queue 33 and the processor-core resource list 37 is omitted. In the following explanation, component names and reference numerals and signs are the same as those in the first embodiment. Functional components of the fifth embodiment are substantially the same as those of the first embodiment. Therefore, in the following explanation, functional component names and reference numerals and signs are the same as those in the first embodiment.

FIG. 20 is a diagram for explaining the data structure of the thread queue 33. Concerning threads stored in the thread queue 33, request resources are described besides IDs for identifying the threads and thread processing start addresses as start addresses of relevant sections in the user program 32 loaded to the RAM 3. It is described that a thread with a start address 0x00001234 and an ID 0 needs a scratch pad memory having size of 8 kilobytes. It is described that a thread with a start address 0x00005678 and an ID 1 needs a scratch pad memory having size of 4 kilobytes and a function that can execute a multiplication command.

Figure 21C:
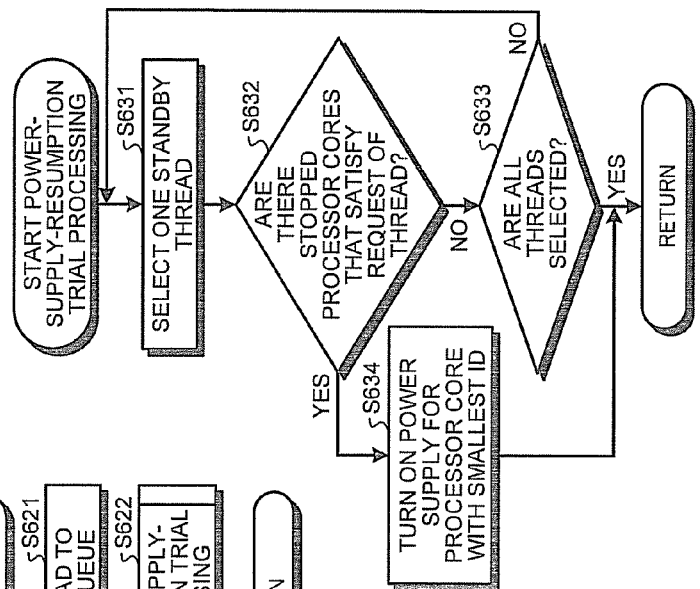
FIGS. 21A to 21C are flowcharts for explaining the operation of a processor core according to the fifth embodiment.
Figure 21B:
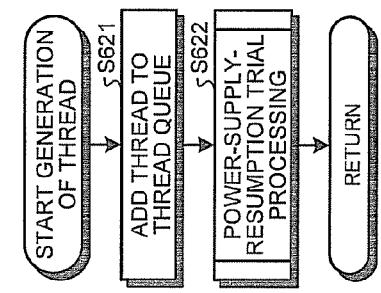
Figure 21A:
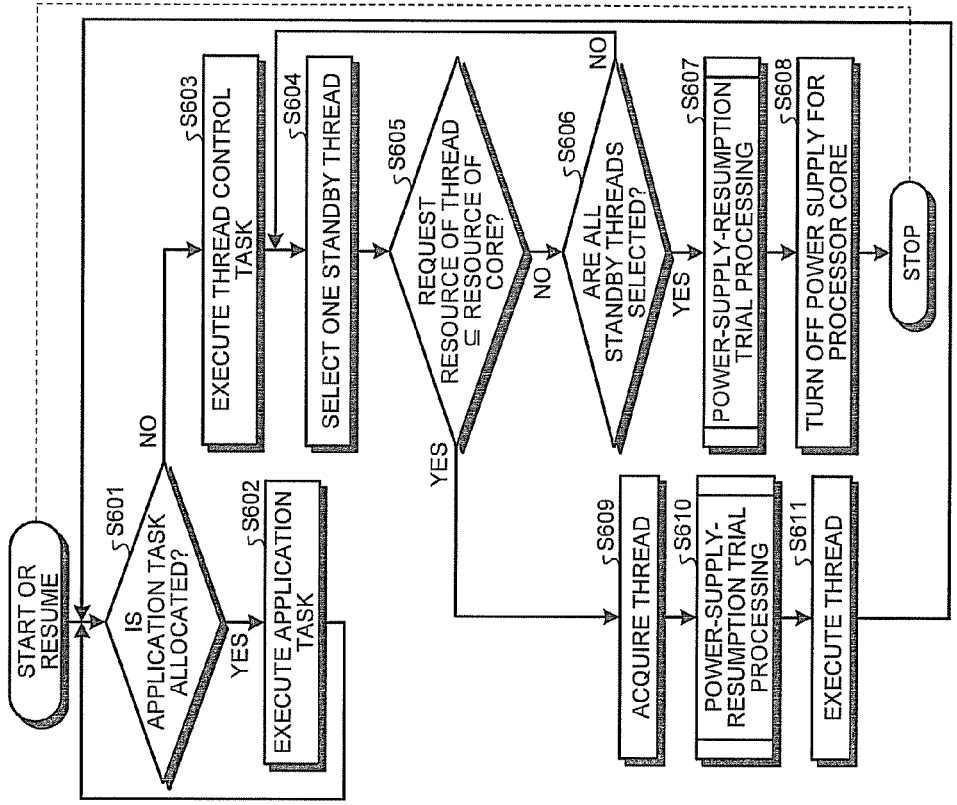

FIGS. 21A to 21C are flowcharts for explaining the operation of the processor cores 1a to 1f according to the fifth embodiment. The processor cores 1a to 1f can execute the same operation. Therefore, only the operation of the processor core 1a is explained below as a representative of the operation of the processor cores 1a to 1f.

As shown in FIG. 21A, first, the basic control means 101a determines whether the application task is allocated to the processor core 1a (S601). When the application task is allocated ("Yes" at S601), the basic control means 101a executes the application task (S602) and generates a thread. When the processor core 1a ends the execution of the application task, the operation shifts to S601.

When it is determined that the application task is not allocated ("No" at S601), the basic control means 101a starts and executes the thread control task (S603). The thread control task selects one standby thread (S604) and determines, based on the processor-core resource list 37, whether a resource of the processor core 1a satisfies a resource request of the selected standby thread (S605). When the resource does not satisfy the resource request ("No" at S605), the thread control task further determines whether all standby threads are selected (S606). When there are unselected standby threads ("No" at S606), the thread control task shifts to S604 and selects one of the unselected standby threads. When there is no unselected standby thread ("Yes" at S606), the power-supply resuming means 103 executes the power-supply-resumption trial processing (S607). The thread control task transmits a signal to the power supply system 4 and causes the power supply system 4 to turn off the power supply for the processor core 1a (S608). The processor core 1a stops. When there is no thread queue in which the resource of the processor core 1a satisfies the request resource at S604, the operation skips S605 and S606 and shifts to S607.

When the resource of the processor core 1a satisfies the resource request of the selected standby thread ("Yes" at S605), the thread control task acquires the selected thread from the thread queue 33 (S609). Then, the power-supply resuming means 103a executes the power-supply-resumption trial processing (S610). The thread control task executes the acquired thread (S611). When the thread control task completes the execution of the thread, the operation shifts to S601.

When the application task is executed (S602), the processor core 1a may generate a new thread. When the thread is executed (S611), the processor core 1a may generate a new thread. FIG. 21B is a flowchart for explaining the operation of the processor core 1a during thread generation. When the processor core 1a generates a new thread, the processor core 1a adds the generated thread to the thread queue 33 (S621). Then, the power-supply resuming means 103a executes the power-supply-resumption trial processing (S622) and the operation returns to the start.

FIG. 21C is a flowchart for explaining the power-supply-resumption trial processing in detail. When the power-supply-resumption trial processing is started, the power-supply resuming means 103a selects one thread (S631) and determines whether there are stopped processor cores that satisfy a request of the thread (S632). When there is no stopped processor core that satisfies the request ("No" at S632), the power-supply resuming means 103a further determines whether there are unselected threads (S633). When there are unselected threads ("No" at S633), the power-supply resuming means 103a shifts to S631 and further selects one thread out of the unselected threads.

When there are stopped processor cores that satisfy the request of the thread ("Yes" at S632), the power-supply resuming means 103a transmits a signal to the power supply system 4 and turns on a power supply for a processor core with a smallest core ID among the stopped processor cores that satisfy the request of the thread (S634). The operation returns to the start. When all the threads are selected ("Yes" at S633), the operation also returns to the start.

As explained above, according to the fifth embodiment, as in the fourth embodiment, even in an asynchronous multi-core processor system, it is possible to turn on and off processor-core power supplies according to a load state without preparing a processor and hardware exclusively used for power supply control.

In a multi-core processor system according to a sixth embodiment of the present invention, in expectation that, when there is a processor core that is about to complete execution of a thread soon, a thread can be distributed to this processor core in near future, an unnecessary processor core is not added.

Figure 22:
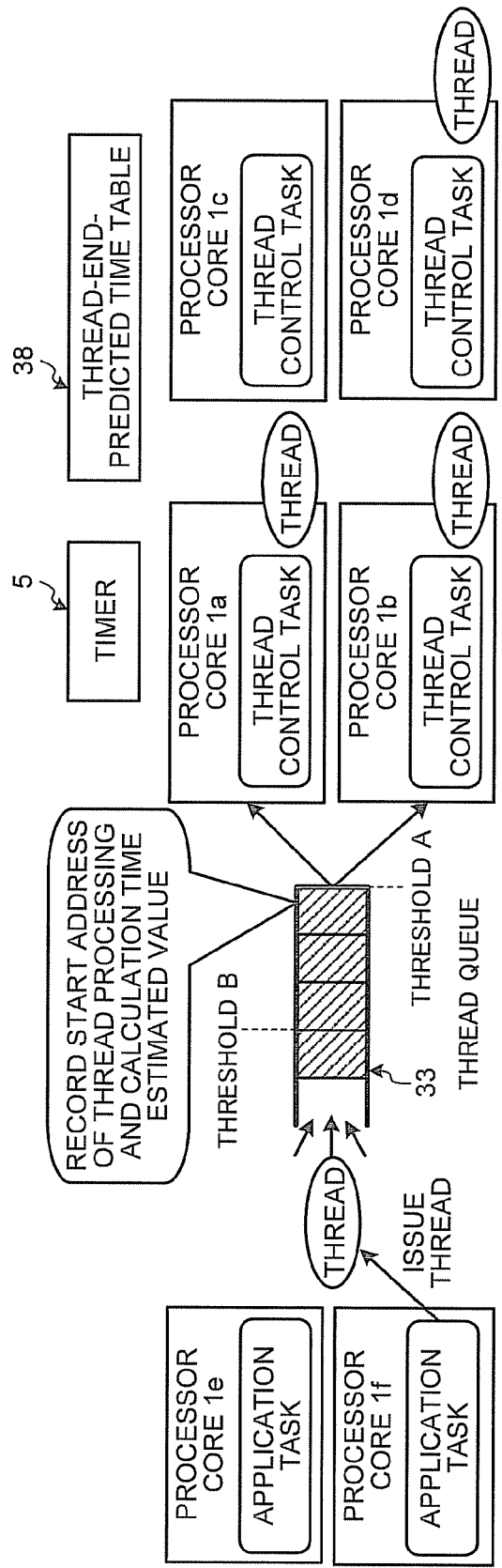
FIG. 22 is a schematic diagram for explaining a multi-core processor system according to a sixth embodiment of the present invention.

FIG. 22 is a schematic diagram for explaining the multi-core processor system according to the sixth embodiment. The multi-core processor system according to the sixth embodiment includes the timer 5 and a thread-end-predicted time table 38 in which execution-end predicted time of threads is recorded. An area in which the thread-end-predicted time table 38 is stored in not specifically limited. For example, the area is the RAM 3.

Figures 23, 24, 25:
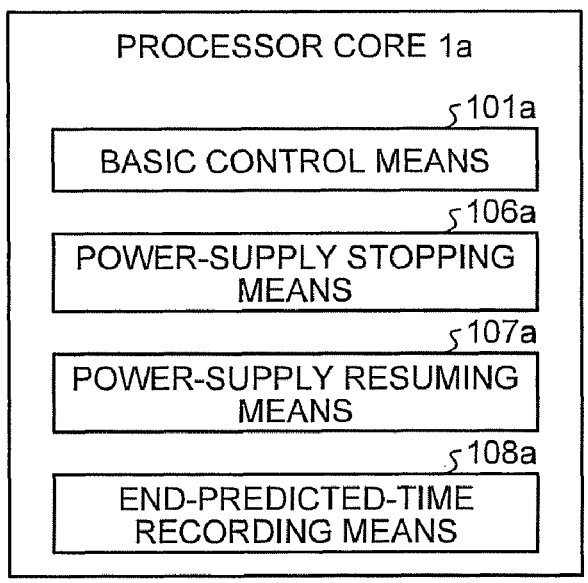
FIG. 23 is a diagram for explaining an example of a thread-end-predicted time table.
FIG. 24 is a diagram for explaining the data structure of a thread queue.
FIG. 25 is a diagram for explaining functions generated in a processor core.

FIG. 23 is a diagram for explaining an example of the thread-end-predicted time table 38. In the thread-end-predicted time table 38, it is described that threads currently operating in a processor core are threads with core IDs 1, 2, and 4 and respectively end at time "1240000000", "1150000000", and "1380000000". It is also described that a processor core with a core ID 3 is in the power-off state. A unit of time is not specifically limited. For example, the unit is the number of cycles after the timer 5 is started.

FIG. 24 is a diagram for explaining the data structure of the thread queue 33 of the multi-core processor system according to the sixth embodiment. In the sixth embodiment, the thread queue 33 stores a thread processing start address and an estimated value of calculation time of a thread as a set for each of threads. The estimated value of calculation time can be any value as long as the value from which calculation time can be estimated. For example, the estimated value is a necessary number of cycles.

In the following explanation, names and reference numerals and signs of components other than the timer 5 and the thread-end-predicted time table 38 are the same as those in the first embodiment. FIG. 25 is a diagram for explaining functions generated by the processor core 1a executing the basic program 31. The basic program 31 generates the basic control means 101a, power-supply stopping means 106a, power-supply resuming means 107a, and end-predicted-time recording means 108a. The basic control means 101a starts the application task and the thread control task. The power-supply stopping means 106*a* is implemented in the thread control task. When the thread queue 33 does not include a thread that should be acquired, the power-supply stopping means 106*a* transmits a power-supply control signal for turning off the power supply for the processor core 1*a* to the power supply system 4. When the application task or a thread operating in the processor core 1*a* generates a thread anew, the power-supply resuming means 107*a* executes the power-supply-resumption trial processing. The end-predicted-time recording means 108*a* is implemented in the thread control task. When a thread is acquired from the thread queue 33, the end-predicted-time recording means 108*a* calculates end-predicted time of the acquired thread based on an estimated value of calculation time of the thread stored in the thread queue 33 and a value of the timer 5 and writes the calculated end-predicted time in the thread-end-predicted time table 38. The processor cores 1*b* to 1*f* respectively generate, based on the basic program 31, functions same as those generated by the processor core 1*a*. However, explanation concerning the functions related to the processor cores 1*b* to 1*f* is omitted to avoid repetition of the explanation.

FIGS. 26A to 26C are flowcharts for explaining the operation of the processor cores 1*a* to 1*f*. The processor cores 1*a* to 1*f* can execute the same operation. Therefore, only the operation of the processor core 1*a* is explained below as a representative of the operation of the processor cores 1*a* to 1*f*.

As shown in FIG. 26A, first, the basic control means 101*a* determines whether the application task is allocated to the processor core 1*a* (S701). When the application task is allocated ("Yes" at S701), the basic control means 101*a* executes the application task (S702). When the application task is executed, the processor core 1*a* generates a thread. When the processor core 1*a* ends the execution of the application task, the operation shifts to S701.

When it is determined that the application task is not allocated ("No" at S701), the basic control means 101*a* starts and executes the thread control task (S703). The thread control task calculates, referring to the timer 5 and the thread-end-predicted time table 38, the number of cores having remaining execution time equal to or smaller than a threshold T set in advance and sets the number of cores as the number of end-expected cores (S704). The thread control task calculates a value obtained by subtracting the number of end-expected cores from the number of standby threads of the thread queue 33 and sets the value as an actual number of standby threads (S705).

The thread control task determines whether the actual number of standby threads exceeds a threshold A (S706). When the actual number of standby threads does not exceed the threshold A ("No" at S706), the thread control task transmits a power-supply control signal for turning off the power supply for the processor core 1*a* to the power supply system 4 and turns off the power supply (S707) and stops the operation. When the actual number of standby threads exceeds the threshold A ("Yes" at S706), the thread control task acquires a thread from the thread queue 33 (S708). The power-supply resuming means 103*a* executes the power-supply-resumption trial processing (S709). The thread control task calculates end-predicted time based on present time indicated by the timer 5 and an estimated value of calculation time of the acquired thread incidental to the thread queue 33, writes the calculated end-predicted time in the thread-end-predicted time table 38 (S710), and executes the acquired thread (S711). When the thread control task completes the execution of the thread, the operation shifts to S701.

When the application task is executed (S702), the processor core 1*a* may generate a new thread. When the thread is executed (S711), the processor core 1*a* may also generate a new thread. FIG. 26B is a flowchart for explaining the operation of the processor core 1*a* during thread generation. When the processor core 1*a* generates a new thread, the processor core 1*a* adds the generated thread to the thread queue 33 (S711). Then, the power-supply resuming means 103*a* executes the power-supply-resumption trial processing (S722) and the operation returns to the start.

FIG. 26C is a flowchart for explaining in detail the power-supply-resumption trial processing executed at S709 and S722. When the power-supply-resumption trial processing is started, the power-supply resuming means 107*a* calculates, referring to the timer 5 and the thread-end-predicted time table 38, the number of cores having remaining execution time equal to or smaller than the threshold T set in advance and sets the number of cores as the number of end-expected cores (S731). The power-supply resuming means 107*a* calculates a value obtained by subtracting the number of end-expected cores from the number of standby threads of the thread queue 33 and sets the value as an actual number of standby threads (S732). The power-supply resuming means 107*a* determines whether the actual number of standby threads exceeds a threshold B (S733). When the actual number of standby threads exceeds the threshold B ("Yes" at S733), the power-supply resuming means 107*a* further determines whether there are processor cores in the power-off state (S734). When there are processor cores in the power-off state ("Yes" at S734), the power-supply resuming means 107*a* transmits a power-supply control signal for turning on the power supply for a processor core with a smallest ID number among the processor cores in the power-off state to the power supply system 4 and turns on the power supply for the processor core (S735). The operation of the power-supply-resumption trial processing returns to the start. When the actual number of standby threads does not exceed the threshold B ("No" at S733) or when there is no processor core in the power-off state ("No" at S734), the operation of the power-supply-resumption trial processing directly returns to the start.

As explained above, according to the sixth embodiment, the multi-core processor system includes the end-predicted-time recording means for calculating end-predicted time of an acquired thread based on an estimated value (calculation time information) of calculation time stored in the thread queue 33 and a value of the timer 5 and writing the calculated end-predicted time in the thread-end-predicted time table 38, the power-supply stopping means for calculating the number of end-expected cores based on the thread-end-predicted time table 38 and a value of the timer 5 and causing, when a value obtained by subtracting the number of end-expected cores from the number of standby threads is equal to or smaller than the threshold A, the power supply system 4 to stop power supply to an own processor core, and the power-supply resuming means for causing, when the number of end-expected cores exceeds the threshold B, the power supply system 4 to resume power supply to the other stopped processor cores. Therefore, in the multi-core processor system, in expectation that, when there is a processor core that is about to complete execution of a thread soon, a thread can be distributed to this processor core in near future, an unnecessary processor core is not added.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A multi-core processor system comprising:
a plurality of processor cores;
a power supply unit that stops supplying or supplies power to each of the processor cores individually; and
a thread queue that stores threads that the multi-core processor system causes the processor cores to execute, wherein
each of the processor cores includes:
a power-supply stopping unit that causes the power supply unit to stop power supply to an own processor core when a number of threads stored in the thread queue is equal to or smaller than a first threshold; and
a power-supply resuming unit that causes the power supply unit to resume power supply to the other stopped processor cores when the number of threads stored in the thread queue exceeds a second value equal to or lager than the first threshold.

2. The multi-core processor system according to claim 1, further comprising a storing unit that stores the thread queue.

3. The multi-core processor system according to claim 2, wherein both the first threshold and the second threshold are zero.

4. The multi-core processor system according to claim 2, further comprising:
a timer; and
a power-off time table in which power-off time of each of the processor core is recorded, wherein
the power-supply stopping unit acquires time referring to the timer before stopping the power supply to the own processor core and records the acquired time in the power-off time table as power-off time, and
the power-supply resuming unit resumes, when the number of threads stored in the thread queue exceeds the second threshold, power supply to a processor core in which a predetermined time has elapsed from the power-off time recorded in the power-off time table among the stopped processor cores.

5. The multi-core processor system according to claim 4, wherein the storing unit stores the power-off time table.

6. The multi-core processor system according to claim 2, wherein the second threshold is a value lager than the first threshold.

7. The multi-core processor system according to claim 2, wherein the first threshold and the second threshold increase or decrease according to an increase or decrease of a number of processor cores that are executing threads.

8. A multi-core processor system comprising:
a plurality of processor cores;
a power supply unit that stops supplying or supplies power to each of the processor cores individually; and
a thread queue that stores threads that the multi-core processor system causes the processor cores to execute, wherein
each of the processor cores includes:
a power-supply stopping unit that causes the power supply unit to stop power supply to an own processor core when a resource of an own processor core satisfies none of resource requests of threads stored in the thread queue; and
a power-supply resuming unit that causes, when there is a processor core having a resource that satisfies the resource requests of the threads stored in the thread queue among the other stopped processor cores the power supply unit to resume power supply to the other processor core.

9. The multi-core processor system according to claim 8, further comprising a storing unit that stores the thread queue.

10. The multi-core processor system according to claim 9, wherein the storing unit stores a plurality of thread queues for each of resource requests of threads stored therein.

11. The multi-core processor system according to claim 10, wherein the storing unit stores a requested resource list in which a requested resource for each of the thread queues is described and a processor-core resource list in which a resource for each of the processor cores is described.

12. The multi-core processor system according to claim 9, wherein
the thread queue stores, for each of threads, a resource request of a thread stored therein, and
the storing unit stores a processor-core resource list in which a resource for each of the processor cores is described.

13. A multi-core processor system comprising:
a plurality of processor cores;
a power supply unit that stops supplying or supplies power to each of the processor cores individually;
a timer;
a thread queue that stores, together with calculation time information indicating time necessary for execution, threads that the multi-core processor system causes the processor cores to execute; and
a thread-end-predicted time table that records end-predicted time of a thread being executed by each of the processor cores, wherein
each of the processor cores includes:
an end-predicted-time recording unit that calculates, when a thread is acquired from the thread queue, end-predicted time of the acquired thread based on the calculation time information stored in the thread queue and a value of the timer and writes the calculated end-predicted time in the thread-end-predicted time table;
a power-supply stopping unit calculates, based on the thread-end-predicted time table and the value of the timer, a number of end-expected cores as a number of processor cores that are expected to end thread execution soon and causes the power supply unit to stop power supply to an own processor core when a value obtained by subtracting the calculated number of end-expected cores from a number of threads stored in the thread queue is equal to or smaller than a first threshold; and
a power-supply resuming unit that causes the power supply unit to resume power supply to the other stopped processor cores when the value obtained by subtracting the calculated number of end-expected cores from the number of threads stored in the thread queue exceeds a second threshold equal to or larger than the first threshold.

14. The multi-core processor system according to claim 13, further comprising a storing unit that stores the thread queue and the thread-end-predicted time table.

* * * * *